United States Patent
Takatsu

(10) Patent No.: US 10,305,402 B2
(45) Date of Patent: May 28, 2019

(54) MOTOR CONTROL APPARATUS, SHEET CONVEYANCE APPARATUS, DOCUMENT FEEDING APPARATUS, DOCUMENT READING APPARATUS, AND IMAGE FORMING APPARATUS

(71) Applicant: CANON KABUSHIKI KAISHA, Tokyo (JP)

(72) Inventor: Junya Takatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/480,092

(22) Filed: Apr. 5, 2017

(65) Prior Publication Data
US 2017/0302203 A1  Oct. 19, 2017

(30) Foreign Application Priority Data

Apr. 13, 2016 (JP) .................................. 2016-080474
Mar. 22, 2017 (JP) .................................. 2017-056464

(51) Int. Cl.
*H02P 27/08* (2006.01)
*H02P 8/12* (2006.01)
(Continued)

(52) U.S. Cl.
CPC ................ *H02P 8/12* (2013.01); *B65H 1/04* (2013.01); *B65H 5/06* (2013.01); *G03G 15/50* (2013.01); *G03G 15/6564* (2013.01); *H02M 7/5395* (2013.01); *H02P 8/36* (2013.01); *H02P 27/08* (2013.01); *H04N 1/00588* (2013.01); *H04N 1/00602* (2013.01); *B65H 2555/26* (2013.01); *B65H 2801/06* (2013.01); *G03G 2221/1657* (2013.01); *H02M 2001/0009* (2013.01); *H04N 2201/0081* (2013.01)

(58) Field of Classification Search
CPC .. H02P 27/08; H02P 8/12; H02P 8/36; H02M 7/5395; H02M 2001/0009
See application file for complete search history.

(56) References Cited

U.S. PATENT DOCUMENTS

| 8,816,612 B2* | 8/2014 | Suzuki ................... H02P 27/08 318/139 |
| 8,970,146 B2 | 3/2015 | Pollock et al. |

(Continued)

FOREIGN PATENT DOCUMENTS

| JP | H06-225595 A | 8/1994 |
| JP | 3661864 B | 6/2005 |
| JP | 5537565 B | 7/2014 |

*Primary Examiner* — Luis A Gonzalez
(74) *Attorney, Agent, or Firm* — Venable LLP

(57) ABSTRACT

A PWM signal generation unit generates a PWM signal based on a driving voltage so that a midpoint of the longer period out of an H level period and an L level period in each PWM period matches a midpoint of the PWM period. FETs of a full bridge circuit (a driving circuit) are driven according to a PWM signal, and a driving current that corresponds to an A-phase is supplied to a stepping motor. A current detector detects a driving current flowing through an A-phase winding of the motor based on a voltage that is generated across a shunt resistor, at a fixed time point that is in each PWM period and in the H level or L level period that is at the center of the PWM period.

17 Claims, 13 Drawing Sheets

(51) Int. Cl.
*B65H 1/04* (2006.01)
*B65H 5/06* (2006.01)
*H04N 1/00* (2006.01)
*H02M 7/5395* (2006.01)
*H02P 8/36* (2006.01)
*G03G 15/00* (2006.01)
*H02M 1/00* (2006.01)

(56) References Cited

U.S. PATENT DOCUMENTS 9,787,241 B2 * 10/2017 Hirota .................. H02P 27/08
9,859,832 B2 * 1/2018 Mori .................... H02P 6/14

* cited by examiner

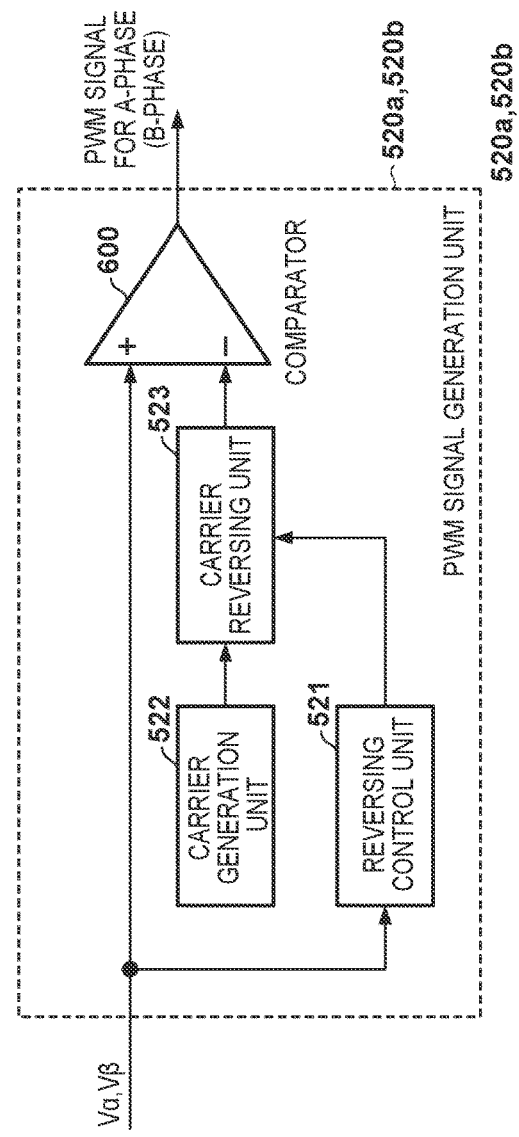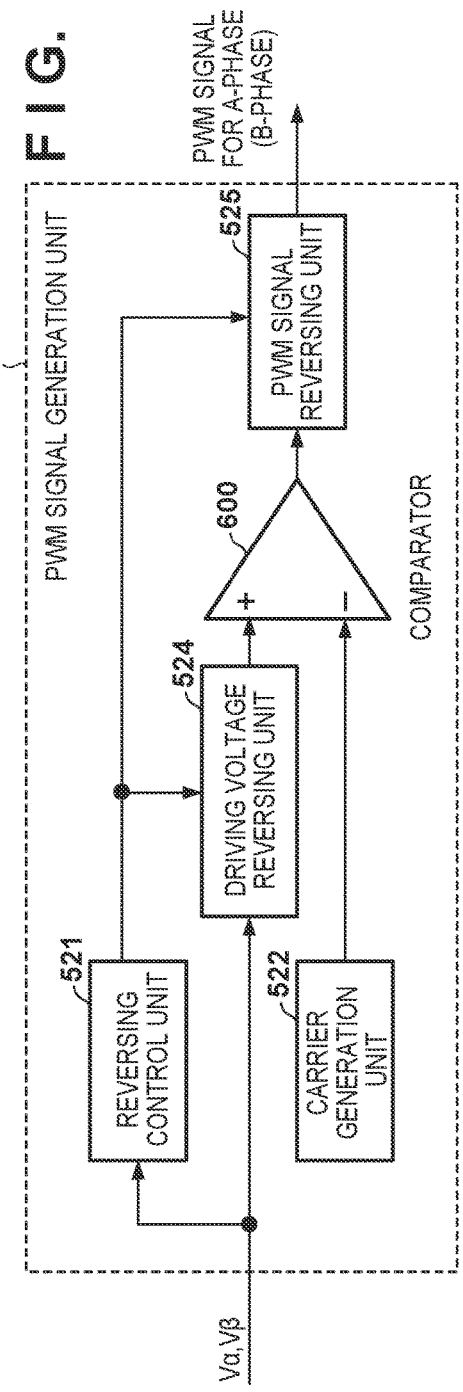

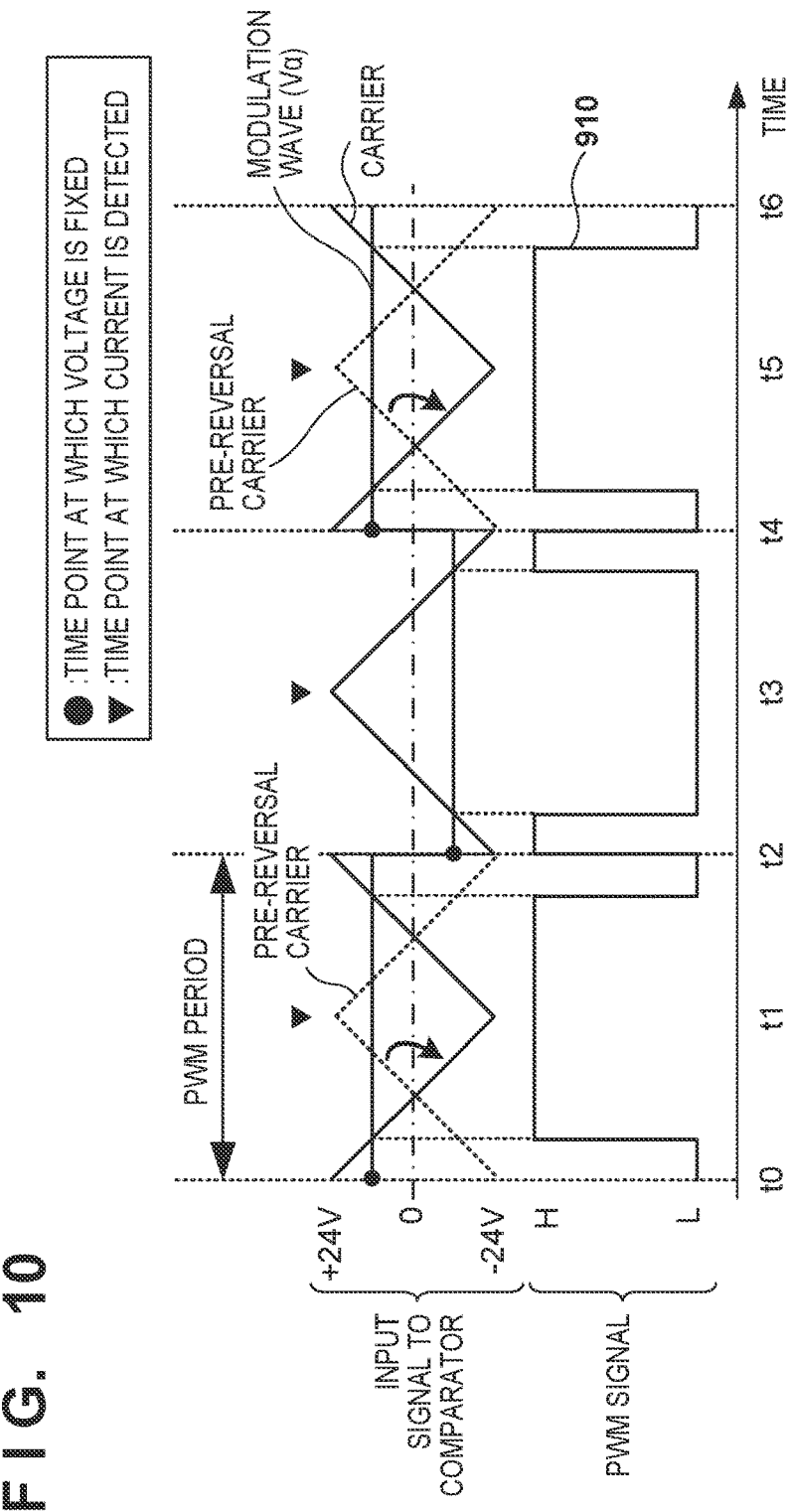

MOTOR CONTROL APPARATUS, SHEET CONVEYANCE APPARATUS, DOCUMENT FEEDING APPARATUS, DOCUMENT READING APPARATUS, AND IMAGE FORMING APPARATUS

BACKGROUND OF THE INVENTION

Field of the Invention

The present invention relates to motor drive control, and in particular to drive control for a motor such as a stepping motor that can be used as a driving source for a load in an image forming apparatus such as a copier or a printer.

Description of the Related Art

In image forming apparatuses that have a sheet conveyance apparatus that conveys sheets such as recording media or documents, motors such as stepping motors (hereinafter referred to as motors) are widely used as a driving source of a conveyance system that conveys the sheets. The rotational speed of a rotor of a motor and the rotational phase of a rotor of a motor are controlled by the period of pulses and the number of pulses that are provided to the motor being controlled. If a load torque that is applied to the rotor of the motor exceeds output torque that corresponds to the driving current that is supplied to the windings of the motor, there is the possibility that the motor enters a state in which the motor is not synchronized with the input signal and control is impossible (a step-out state). In order to prevent the motor from entering the step-out state, it is required that a driving current that corresponds to torque that is obtained by adding a predetermined margin to the load torque that is necessary for the rotor of the motor to rotate is supplied to the windings of the motor. However, there is a problem in which power consumption increases due to the addition of the predetermined margin, and also, vibrations and noise occur in the apparatus due to excessive torque.

As technology for addressing such a problem, a control method that is called vector control (or FOC: Field Oriented Control) has been proposed. Vector control is a method for controlling the amplitude of a driving current and the phase of a driving current based on a rotating coordinate system that is represented using a d-axis, which extends in the direction of magnetic flux of the rotor, and a q-axis, which extends in the direction that is orthogonal to the d-axis, so that appropriate torque is generated in the motor. In vector control, the driving current that is supplied to the windings of the motor is represented using a q-axis component (a torque current component) that is a current component that generates torque for rotating the rotor, and a d-axis component (an excitation current component) that is a current component that affects the strength of the magnetic flux that penetrates through the windings. The value of the torque current component is controlled in response to changes in the load torque that is applied to the rotor, and thus the torque that is required for rotation is efficiently generated. As a result, an increase in motor noise and an increase in power consumption resulting from excessive torque are suppressed. Also, the motor is prevented from entering the step-out state.

The above-described vector control requires a configuration for detecting the rotational phase of the rotor of the motor. U.S. Pat. No. 8,970,146 discloses that an induced voltage that is to be generated in the windings of the motor corresponding to the respective phases is determined (calculated) based on the driving current flowing through the windings of the motor corresponding to the respective phases. The rotational phase of the rotor is determined based on the induced voltage thus determined.

For example, a full bridge circuit that is constituted by switching elements (FETs) that are driven by a PWM signal that corresponds to the driving voltage of the motor is used as a driving circuit that drives the motor such as a stepping motor. The full bridge circuit supplies a driving current that is in accordance with the switching of the FETs that are driven by a PWM signal, to the windings of the motor.

In order to realize motor drive control using the above-described vector control, a configuration for detecting the driving current that is supplied from the driving circuit to the windings of the motor, and estimating (determining) the rotational phase of the rotor is required.

In order to prevent an error from occurring due to the capability of the FETs to follow changes in the level of the PWM signal, the driving current needs to be detected at a time point that is separated from a time point at which the level of the PWM signal changes. However, since the lengths of the high level periods of the PWM signal and the lengths of low level periods of the PWM signal change in response to the driving voltage, it can be impossible to detect the driving current at constant time intervals. If the time intervals at which the driving current is detected are not constant and are irregular, then the result of detection of the driving current is distorted. Consequently, if the motor is controlled based on the distorted driving current, the control of the motor is unstable.

SUMMARY OF THE INVENTION

The present invention has been made in light of the above-described problem. The present invention prevents a problem in which the driving current flowing through windings of the motor is not detected at constant time intervals due to the driving current being detected at time points that are determined based on the duty ratio of the PWM signal.

According to one aspect of the present invention, there is provided a motor control apparatus comprising: a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in anti-phase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

According to another aspect of the present invention, there is provided a motor control apparatus comprising: a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first driving voltage that drives the driving circuit and a triangle wave that serves as a carrier wave, and including a pulse at a high level and a pulse at a low level, the second PWM signal being a PWM signal that is in antiphase with a third PWM signal generated based on both a second driving voltage that has a reversed polarity to a porality of the first driving voltage and the triangle wave, and the second PWM signal including a pulse at the high level and a pulse at the low level; and a detector configured to, if the first driving voltage is greater than or equal to a predetermined value, detect a driving current in a high period in which the second PWM signal generated by the pulse generator is at the high level, and if the first driving voltage is smaller than the predetermined value, detect the driving current in a low period in which the first PWM signal generated by the pulse generator is at the low level, wherein the pulse generator is configured to generate the first PWM signal and the second PWM signal based on the driving current detected by the detector.

According to still another aspect of the present invention, there is provided a sheet conveyance apparatus comprising: a conveyance roller configured to convey a sheet; a motor configured to drive the conveyance roller; a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in antiphase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

According to yet another aspect of the present invention, there is provided a document feeding apparatus comprising: a document tray on which a document is to be stacked; a conveyance roller configured to convey the document that is stacked on the document tray; a motor configured to drive the conveyance roller; a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in antiphase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

According to still yet another aspect of the present invention, there is provided a document reading apparatus comprising: a document tray on which a document is to be stacked; a conveyance roller configured to convey the document that is stacked on the document tray; a reading unit configured to read the document that is conveyed by the conveyance roller; a motor configured to drive the conveyance roller; a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in antiphase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

According to yet still another aspect of the present invention, there is provided an image forming apparatus comprising: a conveyance roller configured to convey a recording medium; an image forming unit configured to form an image on the recording medium that is conveyed by the conveyance roller; a motor configured to drive the conveyance roller; a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in antiphase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

According to still yet another aspect of the present invention, there is provided an image forming apparatus for forming an image on a recording medium, comprising: a motor configured to drive a load; a driving circuit that includes a plurality of switching elements constituting an H bridge circuit, and to which a winding of a motor is connected; a pulse generator configured to generate a first PWM signal and a second PWM signal that control ON and OFF operations of the plurality of switching elements, the first PWM signal being generated based on a first triangle wave that serves as a carrier wave, and including a pulse at a first level that is one of a high level and a low level, and a pulse at a second level that is the other one of the high level and the low level, and the second PWM signal being generated based on a second triangle wave that is in antiphase with the first triangle wave, and including a pulse at the first level and a pulse at the second level; and a detector configured to, if a duty ratio of the first PWM signal is smaller than a predetermined value, detect a driving current in a second period in which the first PWM signal generated by the pulse generator is at the second level, and if the duty ratio of the first PWM signal is greater than or equal to the predetermined value, detect the driving current in a third period in which the second PWM signal generated by the pulse generator is at the first level, the duty ratio indicating a proportion of a first period in which the first PWM signal is at the first level, to a duration of one cycle of the first PWM signal, wherein the pulse generator is configured to generate the first PWM signal and the second PWM signal based on the driving current detected by the detector.

The present invention prevents a problem in which the driving current flowing through windings of the motor is not detected at constant time intervals due to the driving current being detected at time points that are determined based on the duty ratio of the PWM signal. Consequently, it is possible to prevent the control of the motor from being unstable.

Further features of the present invention will become apparent from the following description of exemplary embodiments (with reference to the attached drawings).

BRIEF DESCRIPTION OF THE DRAWINGS

FIGS. 9A and 9B are block diagrams showing examples of a configuration of a PWM signal generation unit.

FIG. 10 is a diagram showing an example of a method for generating a PWM signal and examples of time points at which a driving current is detected.

DESCRIPTION OF THE EMBODIMENTS

Hereinafter, embodiments of the present invention will be described with reference to the accompanying drawings. It should be noted that, for example, the shapes of the components described in the embodiments and the positional relationship between them should be changed as appropriate according to the configuration of the apparatus to which the present invention is applied and various conditions, and the following embodiments are not intended to limit the scope of the invention. Although the following describes an example in which a motor control apparatus is provided in an image forming apparatus, apparatuses in which the motor control apparatus can be provided is not limited to an image forming apparatus. For example, the motor control apparatus may be used in a sheet conveyance apparatus that conveys sheets such as recording media or documents.

First Embodiment

<Image Forming Apparatus>

Figure 1:
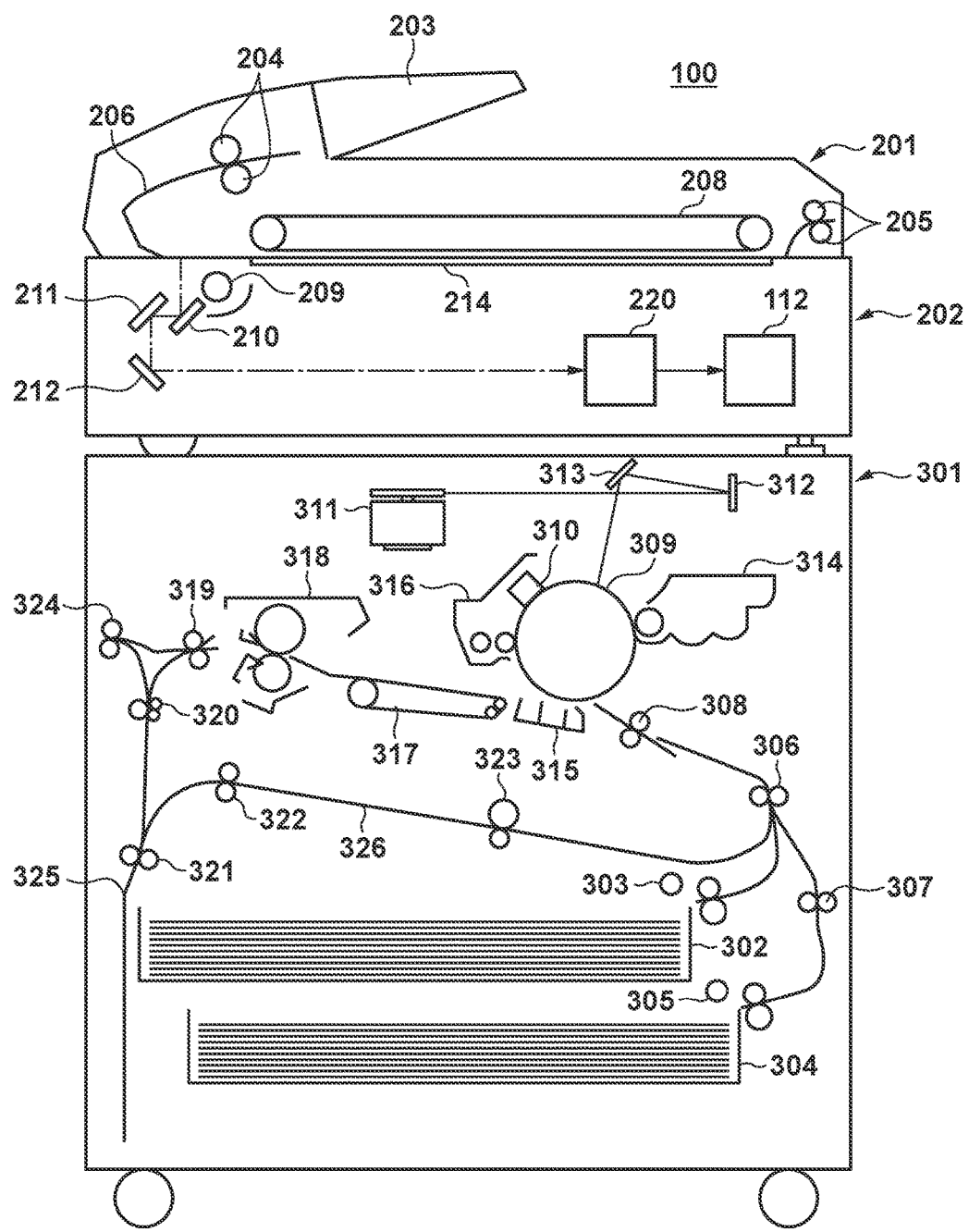
FIG. 1 is a diagram showing an example of an overall configuration of an image forming apparatus.

FIG. 1 is a cross-sectional view showing a configuration of an electrophotographic monochrome copier (hereinafter referred to as an image forming apparatus) 100 that is provided with a sheet conveyance apparatus that is used in the present embodiment. Note that the image forming apparatus is not limited to a copier, and may be a facsimile apparatus, a printing machine, a printer, or the like. Also, the recording method is not limited to the electrophotographic method, and may be an ink jet method or the like. Furthermore, the image forming apparatus may be of either a monochrome type or a color type.

First, an example of a configuration of an image forming apparatus on which a motor control apparatus according to the present invention is to be provided will be described with reference to FIG. 1. The image forming apparatus 100 shown in FIG. 1 includes a document feeding apparatus 201, a reading apparatus 202, and an image forming apparatus body 301.

Documents that are stacked on a document stacking unit 203 of the document feeding apparatus 201 are fed one by one by a feed roller 204, and are conveyed to a glass platen 214 of the reading apparatus 202 via a conveyance guide 206. Furthermore, documents are conveyed by a conveyance belt 208 at a constant speed, and are discharged to the outside of the apparatus by a discharge roller 205. Light reflected from a document image that is illuminated at a reading position of the reading apparatus 202, by a lighting system 209, is guided to an image reading unit 220 by an optical system that includes reflection mirrors 210, 211, and 212, and is converted into an image signal by the image reading unit 220. The image reading unit 220 includes a lens, a CCD which is a photoelectric conversion element, a driving circuit for the CCD, and so on. The image signal output from the image reading unit 220 is subjected to various correction processes that are performed by an image processing unit 112 that includes hardware devices such as an ASIC, and is then output to the image forming apparatus body 301. Document reading is performed in the above-described manner. That is to say, the document feeding apparatus 201 and the reading apparatus 202 function as a document reading apparatus.

A first reading mode and a second reading mode are available as document reading modes. The first reading mode is a mode in which an image on a document that is conveyed at a constant speed is read by the lighting system 209 and the optical system that are fixed at predetermined positions. The second reading mode is a mode in which an image on a document that is displaced on the document glass platen 214 of the reading apparatus 202 is read by the lighting system 209 and the optical system that travel at a constant speed. Usually, images on sheet-like documents are read in the first reading mode, and images on bound documents are read in the second reading mode.

The image forming apparatus 100 has a copy function, which is the function of forming images on recording sheets (recording materials) based on an image signal that is output from the reading apparatus 202. Note that the image forming apparatus 100 also has a printing function, which is the function of forming images on recording sheets based on data that has been received from an external apparatus via a network.

Sheet storage trays 302 and 304 are provided inside the image forming apparatus body 301. Each of the sheet storage trays 302 and 304 can store a different type of recording medium. For example, A4 size sheets of normal paper are stored in the sheet storage tray 302, and A4 size sheets of heavy paper are stored in the sheet storage tray 304. Note that recoding media are media on which images are formed by the image forming apparatus, and include, for example, sheets of paper, resin sheets, cloth, OHP sheets, labels, and so on.

The recording media that are stored in the sheet storage tray 302 are fed by a feed roller 303, and are sent to a registration roller 308 by a conveyance roller 306. The recording media that are stored in the sheet storage tray 304 are fed by a feed roller 305, and are sent to the registration roller 308 by conveyance rollers 307 and 306.

The image signal output from the reading apparatus 202 is input to an optical scanning unit 311 that includes a semiconductor laser and a polygon mirror. The outer circumferential surface of a photosensitive drum 309 is charged by a charger 310. Upon the outer circumferential surface of the photosensitive drum 309 being charged, a laser beam that corresponds to the image signal that has been input from the reading apparatus 202 to the optical scanning apparatus 311 is emitted from the optical scanning unit 311 to the outer circumferential surface of the photosensitive drum 309 via the polygon mirror and mirrors 312 and 313. As a result, an electrostatic latent image is formed on the outer circumferential surface of the photosensitive drum 309.

Thereafter, the electrostatic latent image formed on the photosensitive drum 309 is developed using toner that is supplied from a developer 314, and thus a toner image is formed on the outer circumferential surface of the photosensitive drum 309. The toner image formed on the photosensitive drum 309 is transferred onto a recording medium by a transfer charger 315 that is provided at a position that is opposite the photosensitive drum 309 (a transfer position). At this time, the registration roller 308 sends the recording medium to the transfer position in synchronization with the toner image.

The recording medium onto which the toner image has been transferred in the above-described manner is conveyed to a fixing device 318 by a conveyance belt 317, heat and pressure are applied thereto by the fixing device 318, and thus the toner image is fixed to the recording medium. In this way, an image is formed on a recording medium by the image forming apparatus 100.

When image formation is performed in a one-side printing mode, the recording medium that has passed through the fixing device 318 is discharged to the outside of the apparatus by discharge rollers 319 and 324. When image formation is performed in a both side printing mode, first, fixing processing that is performed to fix the image to the first side of the recording medium is performed by the fixing device 318, and thereafter the recording medium is conveyed to a reverse path 325 by the discharge roller 319, a conveyance roller 320, and a reverse roller 321. Thereafter, the recording medium is conveyed to the registration roller 308 again by conveyance rollers 322 and 323, and the image is formed on the second side of the recording medium in the above-described manner. Thereafter, the recording medium is discharged to a discharge tray (not shown) by the discharge rollers 319 and 324.

If the recording medium with the image formed on the first side is discharged in an image-face down orientation to the outside of the image forming apparatus 100, the recording medium that has passed through the fixing device 318 is conveyed through the discharge roller 319, in a direction toward the conveyance roller 320. Thereafter, the rotation of the conveyance roller 320 reverses immediately before the trailing end of the recording medium passes through a nip portion of the conveyance roller 320, and thus the recording medium with the first side facing downward is discharged to the outside of the image forming apparatus 100 via the discharge roller 324.

This concludes the description of the configuration and the functions of the image forming apparatus 100. Note that a load that is mentioned in the context of the present invention is an object that is driven by a motor. For example, various kinds of rollers (conveyance rollers) such as: the feed rollers 204, 303, and 305; the registration roller 308; and the discharge roller 319, and the photosensitive drum 309, the conveyance belts 208 and 317, the lighting system 209, and the optical system correspond to loads according to the present invention. The motor control apparatus in the present embodiment is applicable to a motor that drives such a load.

<Configuration for Controlling Image Forming Apparatus>

Figure 2:
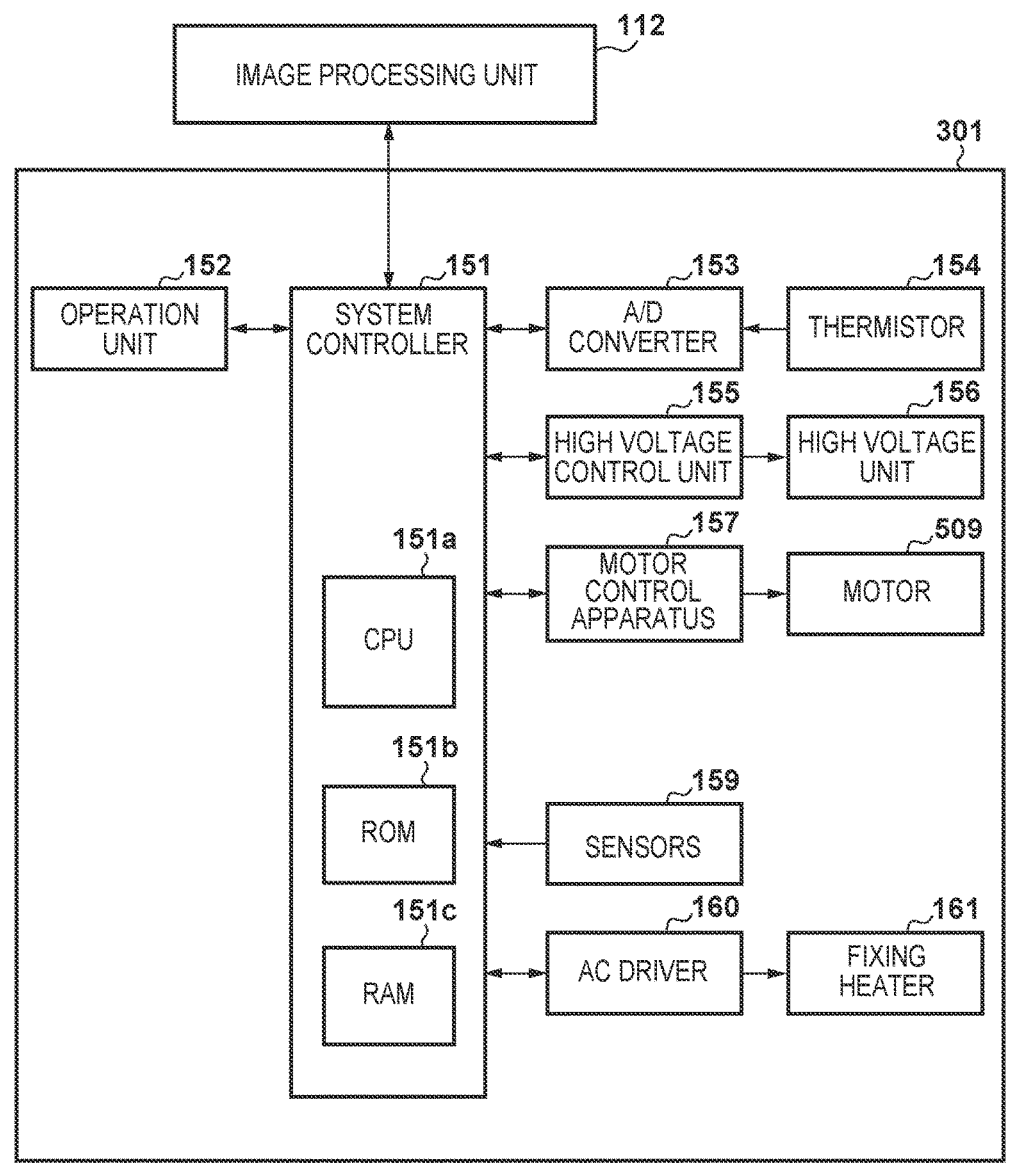
FIG. 2 is a diagram showing an example of a configuration for controlling the image forming apparatus.

FIG. 2 is a block diagram showing an example of a configuration for controlling the image forming apparatus 100. A system controller 151 shown in FIG. 2 includes a CPU 151a, a ROM 151b, and a RAM 151c, and controls the entirety of the image forming apparatus 100. The system controller 151 is connected to an image processing unit 112, an operation unit 152, an analogue/digital (A/D) converter 153, a high-voltage control unit 155, a motor control apparatus 157, sensors 159, and an AC driver 160. The system controller 151 can exchange data with each of the connected units.

The CPU 151a reads out and executes various programs that are stored in the ROM 151b, to execute various sequences that relate to a predetermined image forming sequence. RAM 151c is a storage device. The RAM 151c stores, for example, data such as setting values for the high-voltage control unit 155, instruction values for the motor control apparatus 157, and information that is received from the operation unit 152.

The system controller 151 controls the operation unit 152 so that an operation screen used by the user to perform various settings is displayed on a display unit that is provided on the operation unit 152. The system controller 151 receives information that has been set by the user, from the operation unit 152, and controls the operation sequence of the image forming apparatus 100 based on the information that has been set by the user. Also, the system controller 151 transmits data for informing the user of the status of the image forming apparatus to the operation unit 152. Note that the information that indicates the status of the image forming apparatus is, for example, the number of images to be formed, information that indicates whether or not image formation is currently being performed, and information indicating that a paper jam has occurred and the location of the paper jam. The operation unit 152 displays the information received from the system controller 151 on the display unit.

The system controller 151 (CPU 151a) transmits setting data for each device in the image forming apparatus 100, which is required for image processing that is to be performed by the image processing unit 112, to the image processing unit 112. Also, the system controller 151 receives signals from each device (signals from the sensors 159), and controls the high-voltage control unit 155 based on the signals thus received. The high-voltage control unit 155 supplies the necessary voltage to a high-voltage unit 156 (the charger 310, the developer 314, and the transfer charger 315) based on setting values that have been set by the system controller 151. Note that the sensors 159 include, for example, a sensor for detecting a recording medium that is conveyed by the conveyance rollers.

The motor control apparatus 157 controls a motor 509 according to an instruction that has been output from the CPU 151a. Note that, although only the motor 509 is shown in FIG. 2 as a motor for driving the loads, it is assumed that a plurality of motors is provided in the image forming apparatus in actuality. Alternatively, a configuration in which one motor control apparatus controls a plurality of motors may be employed. Furthermore, although only one motor control apparatus is provided in the image forming apparatus in FIG. 2, it is assumed that a plurality of motor control apparatuses is provided in the image forming apparatus in actuality.

The A/D converter 153 receives a detection signal that has been detected by a thermistor 154 for detecting the temperature of a fixing heater 161, converts the detection signal from an analogue signal to a digital signal, and transmits the digital signal to the system controller 151. The system controller 151 controls the AC driver 160 based on the digital signal that has been received from the A/D converter 153. The AC driver 160 controls the fixing heater 161 such that the temperature of the fixing heater 161 reaches the temperature that is required for performing fixing processing. Note that the fixing heater 161 is a heater that is used to perform fixing processing, and is included in the fixing device 318.

The system controller 151 controls the operation sequence of the image forming apparatus 100 in the above-described manner.

<Vector Control>

Next, the motor control apparatus 157 in the present embodiment will be described. The motor control apparatus 157 in the present embodiment controls the motor using vector control.

First, an overview of vector control for the motor 509, which is performed by the motor control apparatus 157, will be described with reference to FIGS. 3 and 4. Note that the motor in the following description is not provided with a sensor such as a rotary encoder for detecting the rotational phase of the rotor of the motor.

Figure 3:
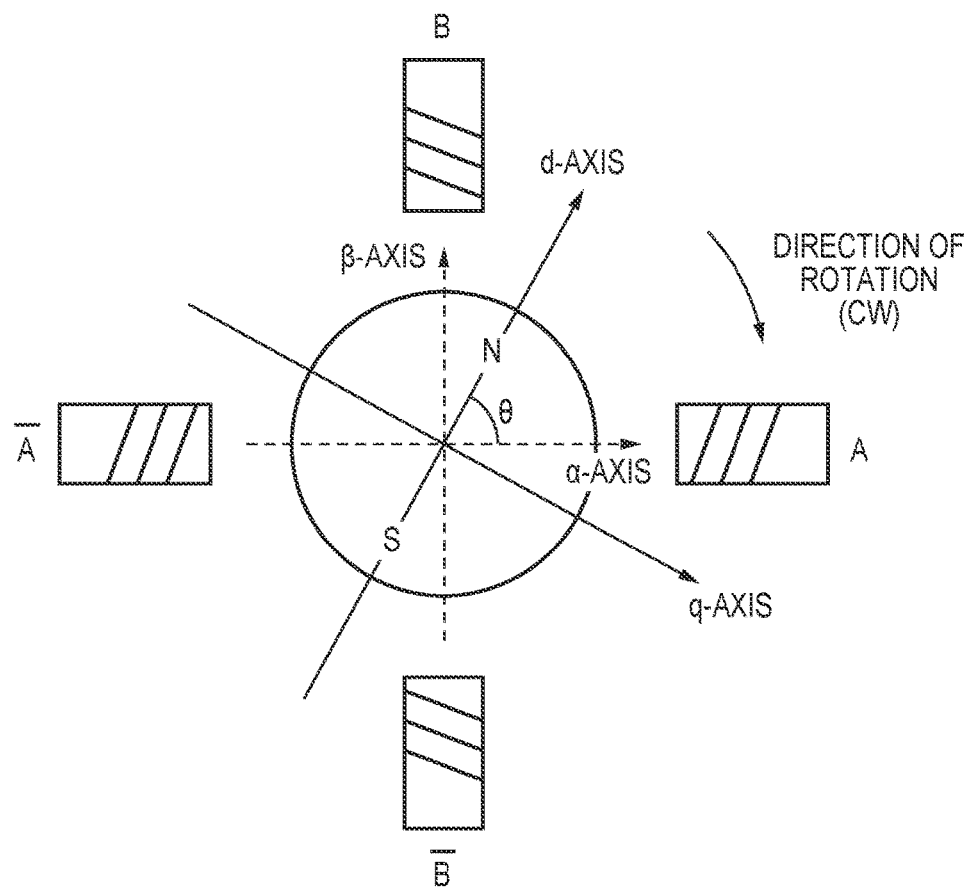
FIG. 3 is a diagram showing a relationship between a motor and d- and q-axes of a rotating coordinate system.

FIG. 3 is a diagram showing a relationship between the stepping motor (hereinafter referred to as the motor) 509 that has two phases, namely the A-phase (the first phase) and the B-phase (the second phase), and the rotating coordinate system that is represented using the d-axis and the q-axis. In FIG. 3, an α-axis which is an axis that corresponds to the A-phase winding, and a β-axis which is an axis that corresponds to the B-phase winding, are defined in a stationary coordinate system. Also, in FIG. 3, the d-axis is defined as being along the direction of magnetic flux that is formed by a magnetic pole of a permanent magnet that is used in the rotor 402, and the q-axis is defined as being along the direction that advances from the d-axis by 90 degrees clockwise (the direction that is orthogonal to the d-axis). The angle formed by the α-axis and the d-axis is defined as θ, and the rotational phase of the rotor 402 is represented as the angle θ. In vector control, the rotating coordinate system defined with the rotational phase θ of the rotor 402 as a reference is used. Specifically, the value of a q-axis component (a torque current component) that generates torque in the rotor, and the value of a d-axis component (an excitation current component) that affects the strength of the magnetic flux that penetrates through the windings are used in vector control. Both components are current components in the rotating coordinate system of the current vector that corresponds to the driving current flowing through the windings.

Vector control is a control method for controlling a motor by performing phase feedback control to control the value of the torque current component and the value of the excitation current component such that the deviation between an instruction phase that indicates a target phase of the rotor and the actual rotational phase decreases. There is also a method for controlling a motor by performing speed feedback control to control the value of the torque current component and the value of the excitation current component such that the deviation between an instruction speed that indicates a target speed of the rotor and the actual rotational speed decreases.

Figure 4:
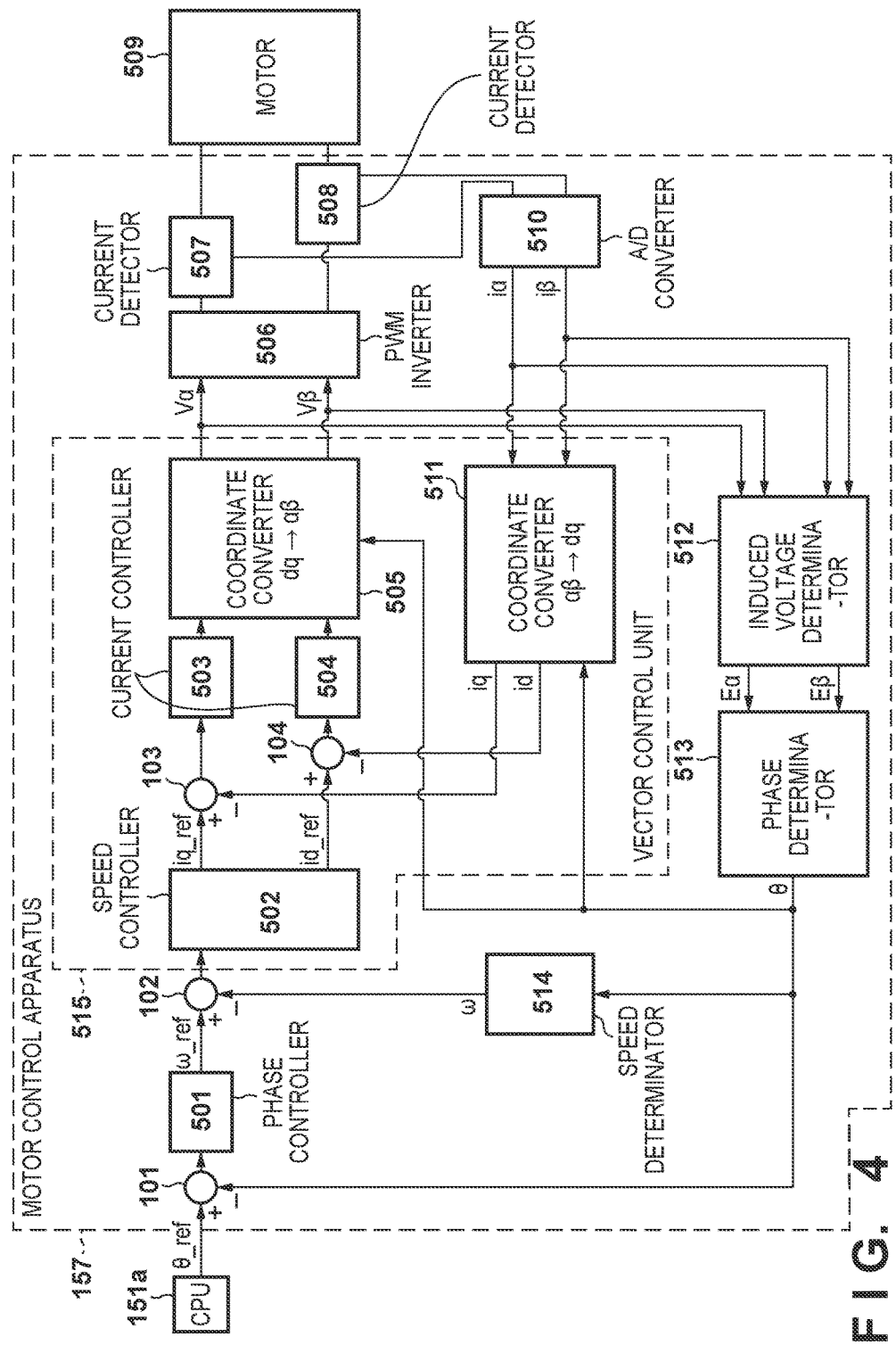
FIG. 4 is a diagram showing an example of a configuration of a motor control apparatus.

FIG. 4 is a block diagram showing an example of a configuration of the motor control apparatus 157 that controls the motor 509. Note that the motor control apparatus 157 is configured with at least one ASIC, and executes each function described below.

In the motor control apparatus 157, the motor 509 is driven by a PWM inverter 506 supplying a driving current to the windings of the motor 509 according to driving voltages Vα and Vβ of the motor 509, which are output from a vector control unit 515. Note that, as shown in FIG. 4, the vector control unit 515 includes a speed controller 502, current controllers 503 and 504, and coordinate converters 505 and 511.

The motor control apparatus 157 performs vector control to control the driving current that is to be supplied to the motor 509, using the current value in the rotating coordinate system with the rotational phase θ of the rotor of the motor 509 as a reference. In vector control, a current vector corresponding to the driving currents that flow through the A-phase winding of the motor 509 and the B-phase winding of the motor 509 is converted from a vector in the stationary coordinate system represented by the α-axis and the β-axis to a vector in the rotating coordinate system represented by the d-axis and the q-axis. As a result of such a conversion, the driving currents supplied to the motor 509 are represented by the direct current d-axis component (the d-axis current) and the direct current q-axis component (the q-axis current) in the rotating coordinate system. In this case, the q-axis current corresponds to the torque current component that generates torque in the rotor of the motor 509, and is a current that contributes to the rotation of the rotor. The d-axis current corresponds to the excitation current component that affects the strength of the magnetic flux that penetrates through the windings of the motor 509. The motor control apparatus 157 can control the q-axis current and the d-axis current independent of each other. Consequently, the motor control apparatus 157 can efficiently generate the torque required for the rotor 402 to rotate.

The motor control apparatus 157 determines the rotational phase and the rotational speed of the rotor of the motor 509, and performs vector control based on the result of determination. As shown in FIG. 4, the motor control apparatus 157 includes a phase controller 501, the speed controller 502, and the current controllers 503 and 504.

The outermost control loop, which includes the phase controller 501, performs phase control on the motor 509 based on the result of determination of the rotational phase θ of the rotor of the motor 509.

The CPU 151a generates an instruction phase θ_ref, which represents the target phase of the rotor 402 of the motor 509, and outputs the instruction phase θ_ref to the motor control apparatus 157 in cycles that have a predetermined period.

A subtractor 101 calculates the deviation between the rotational phase θ of the rotor 402 of the motor 509 and the instruction phase θ_ref, and outputs the deviation to the phase controller 501.

The phase control unit 501 generates an instruction speed ω_ref, which represents the target speed of the rotor 402 of the motor 509, based on proportional control (P), integral control (I), and differential control (D) such that the deviation output from the subtractor 101 decreases, and outputs the instruction speed ω_ref. Specifically, the phase controller 501 generates and outputs the instruction speed ω_ref such that the deviation that has been output from the subtractor 101 based on P control, I control, and D control becomes 0. Note that the P control is a control method for controlling a value that is to be controlled, based on a value that is proportional to a deviation between an instruction value and an estimated value. The I control is a control method for controlling a value that is to be controlled, based on a value that is proportional to a temporal integration of a deviation between an instruction value and an estimated value. The D control is a control method for controlling a value that is to be controlled, based on a value that is proportional to a temporal change in a deviation between an instruction value and an estimated value. Although the phase controller 501 in the present embodiment generates the instruction speed ω_ref based on PID control, this is not essential. For example, the phase controller 501 may generate the instruction speed ω_ref based on PI control. In this way, the phase control unit 501 performs phase control on the rotor of the motor 509.

In the control loop that includes the speed controller 502, speed control is performed on the motor 509 based on the result of determination of a rotational speed ω of the rotor of the motor 509.

The subtractor 102 calculates the deviation between the rotational speed ω of the rotor 402 of the motor 509 and the instruction speed ω_ref, and outputs the deviation to the speed controller 502.

The speed controller 502 generates a q-axis current instruction value iq_ref and a d-axis current instruction value id_ref based on PID control such that the deviation that has been output from the subtractor 102 decreases. Specifically, the speed controller 502 generates and outputs the q-axis current instruction value iq_ref and the d-axis current instruction value id_ref based on PID control such that the deviation that has been output from the subtractor 102 becomes 0. Although the speed controller 502 in the present embodiment generates the q-axis current instruction value iq_ref and the d-axis current instruction value id_ref based on PID control, the present invention is not limited in this way. For example, the speed controller 502 may generate the q-axis current instruction value iq_ref and the d-axis current instruction value id_ref based on PI control. Note that if a permanent magnet is used as the rotor 402, the d-axis current instruction value id_ref that affects the strength of the magnetic flux that penetrates through the winding is usually set to 0. However, the present invention is not limited in this way.

In the control loop that includes the current controllers 503 and 504, the driving currents that flow through the windings of the motor 509 corresponding to the respective phases are controlled based on the detection values of the driving currents that flow through the windings of the motor 509 corresponding to the respective phases. Here, the driving currents (alternating currents) that respectively flow through the A-phase winding of the motor 509 and the B-phase winding of the motor 509 are detected by the current detectors 507 and 508, and are then converted from analogue values to digital values by an A/D converter 510. The current values of the driving currents that have been converted by the A/D converter 510 from analogue values to digital values can be represented by the following equations, using current values iα and iβ in the stationary coordinate system. Note that I denotes the amplitude of the current.

$$i\alpha = I^* \cos\theta$$

$$i\beta = I^* \sin\theta \tag{1}$$

These current values iα and iβ are input to the coordinate converter 511 and an induced voltage determinator 512.

Using the following equations, the coordinate converter 511 converts the current values iα and iβ in the stationary coordinate system to a current value iq of the q-axis current and a current value id of the d-axis current in the rotating coordinate system.

$$id = \cos\theta * i\alpha + \sin\theta * i\beta$$

$$iq = -\sin\theta * i\alpha + \cos\theta * i\beta \quad (2)$$

The q-axis current instruction value iq_ref output from the speed controller 502 and the current value iq output from the coordinate converter 511 are input to a subtractor 103. The subtractor 103 calculates the deviation between the q-axis current instruction value iq_ref and the current value iq, and outputs the deviation to the current controller 503.

The d-axis current instruction value id_ref output from the speed controller 502 and the current value id output from the coordinate converter 511 are input to a subtractor 104. The subtractor 104 calculates the deviation between the d-axis current instruction value id_ref and the current value id, and outputs the deviation to the current controller 504.

The current controller 503 generates a driving voltage Vq based on PID control such that the deviation decreases. Specifically, the current controller 503 generates the driving voltage Vq such that the deviation becomes 0, and outputs the driving voltage Vq to the coordinate converter 505.

The current controller 504 generates a driving voltage Vd based on PID control such that the deviation decreases. Specifically, the current controller 504 generates the driving voltage Vd such that the deviation becomes 0, and outputs the driving voltage Vd to the coordinate converter 505.

In other words, the current controllers 503 and 504 function as a voltage generator. Although the current controllers 503 and 504 in the present embodiment generate the driving voltages Vq and Vd based on PID control, the present invention is not limited in this way. For example, the current controllers 503 and 504 may generate the driving voltages Vq and Vd based on PI control.

Using the following equations, the coordinate converter 505 reversely converts the driving voltage Vq and Vd in the rotating coordinate system, output from the current controllers 503 and 504, to the driving voltages Vα and Vβ in the stationary coordinate system.

$$V\alpha = \cos\theta * Vd - \sin\theta * Vq$$

$$V\beta = \sin\theta * Vd + \cos\theta * Vq \quad (3)$$

The coordinate converter 505 outputs the driving voltages Vα and Vβ thus converted to the PWM inverter 506 that is constituted by a full bridge circuit, and to the induced voltage determinator 512.

Figure 5:
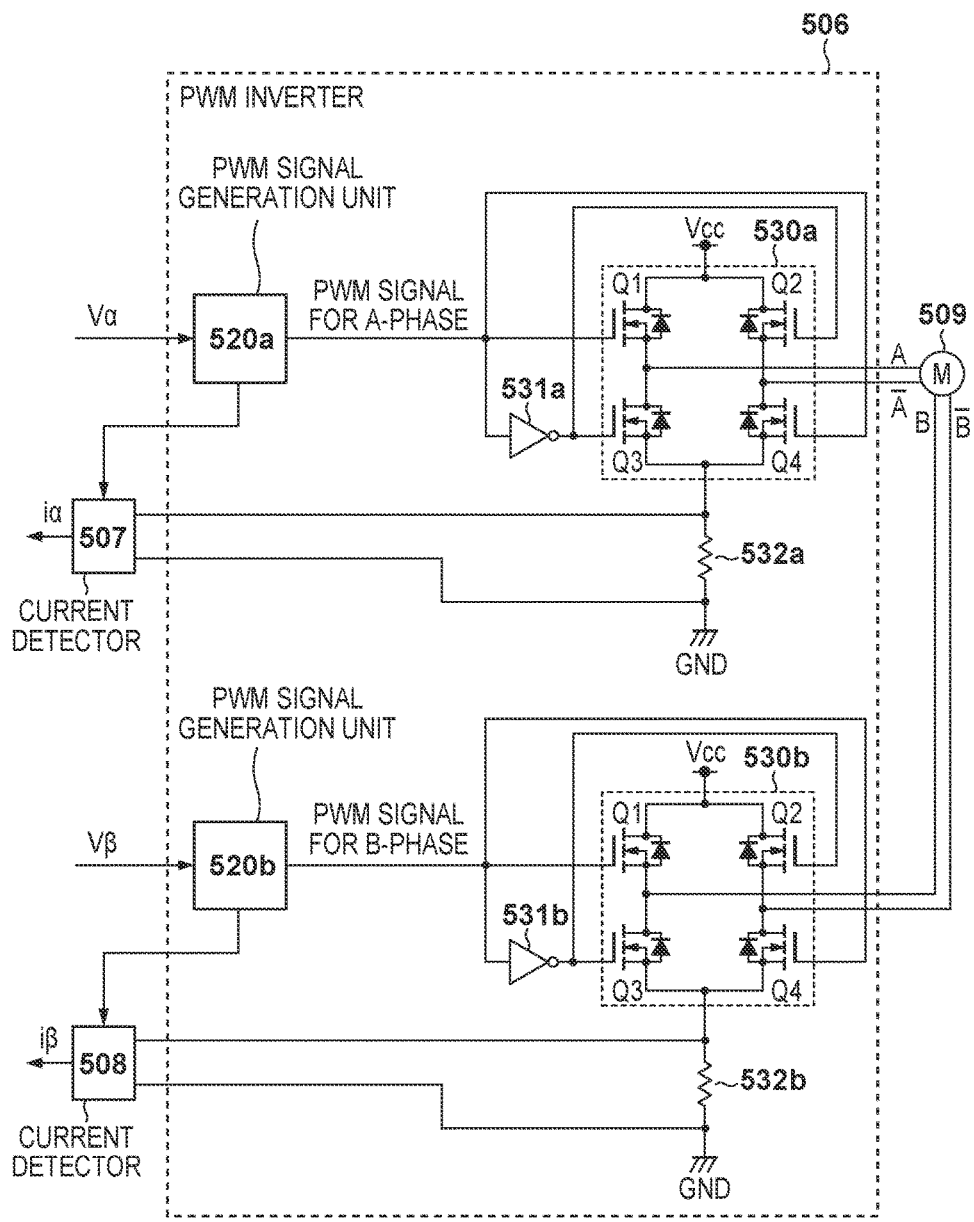
FIG. 5 is a diagram showing an example of a configuration of a PWM inverter.

FIG. 5 is a block diagram showing a configuration of the PWM inverter 506. As shown in FIG. 5, the PWM inverter 506 includes a PWM signal generation unit 520a and a full bridge circuit 530a, and supplies a driving current to the A-phase winding. The PWM inverter 506 also includes a PWM signal generation unit 520b and a full bridge circuit 530b, and supplies a driving current to the B-phase winding.

Using a method that will be described later, the PWM signal generation unit 520a generates a PWM signal according to the driving voltage Vα input from the coordinate converter 505, and outputs the PWM signal to the full bridge circuit 530a. The full bridge circuit 530a is driven by the PWM signal output from the PWM signal generation unit 520a. Consequently, a driving current iα that corresponds to the driving voltage Vα is supplied to the A-phase winding.

Also, using a method that will be described later, the PWM signal generation unit 520b generates a PWM signal according to the driving voltage Vβ input from the coordinate converter 505, and outputs the PWM signal to the full bridge circuit 530b. The full bridge circuit 530b is driven by the PWM signal output from the PWM signal generation unit 520b. Consequently, a driving current iβ that corresponds to the driving voltage Vβ is supplied to the B-phase winding.

Note that, although the PWM inverter in the present embodiment includes a full bridge circuit, the PWM inverter may include a half bridge inverter or the like.

<Sensorless Control>

Next, a method for determining the rotational phase θ will be described. The values of induced voltages Eα and Eβ that are induced in the A-phase winding of the motor 509 and the B-phase winding of the motor 509 due to the rotation of the rotor 402 are used to determine the rotational phase θ of the rotor 402. The values of the induced voltages are determined (calculated) by the induced voltage determinator 512. Specifically, the induced voltages Eα and Eβ are determined based on the current values iα and iβ input from the A/D converter 510 to the induced voltage determinator 512, and the driving voltages Vα and Vβ input from the coordinate converter 505 to the induced voltage determinator 512, using the following equations.

$$E\alpha = V\alpha - R * i\alpha - L * di\alpha/dt$$

$$E\beta = V\beta - R * i\beta - L * di\beta/dt \quad (4)$$

Here, R denotes a winding resistance, and L denotes a winding inductance. The values of R and L are unique to the motor 509 that is used, and are stored in advance in the ROM 151b or a memory (not shown) that is provided in the motor control apparatus 157.

The induced voltages Eα and Eβ determined by the induced voltage determinator 512 are input to a phase determinator 513.

The phase determinator 513 determines the rotational phase θ of the rotor of the motor 509 based on the ratio between the induced voltage Eα and the induced voltage Eβ output from the induced voltage determinator 512, using the following equation.

$$\theta = \tan^{-1}(-E\beta/E\alpha) \quad (5)$$

Although the phase determinator 513 in the present embodiment determines the rotational phase θ by performing a calculation based on the equation (5), the present invention is not limited in this way. For example, the phase determinator 513 may determine the rotational phase θ with reference to a table that is stored in the ROM 151b, for example, and shows a relationship between the induced voltage Eα and the induced voltage Eβ and the rotational phase θ corresponding to the induced voltage Eα and the induced voltage Eβ.

The rotational phase θ of the rotor 402 obtained in the above-described manner is input to the subtractor 101, a speed determinator 514, and the coordinate converters 505 and 511.

The speed determinator 514 determines the rotational speed ω of the rotor of the motor 509 based on temporal changes in the input rotational phase θ, using the following equation.

$$\omega = d\theta/dt \quad (6)$$

The speed determinator 514 outputs the rotational speed ω to the subtractor 102.

The motor control apparatus 157 repeatedly performs the above-described control.

As described above, the motor control apparatus 157 in the present embodiment performs vector control using phase feedback control for controlling the current values in the rotating coordinate system such that the deviation between the instruction phase θ_ref and the rotational phase θ decreases. By performing vector control, it is possible to prevent the motor from entering the step-out state, and to suppress an increase in motor noise and an increase in power consumption resulting from excessive torque.

<PWM Inverter and Current Detectors>

As described above, the motor control apparatus 157 in the present embodiment detects the current values of the driving currents that flow through the windings, and controls the driving currents that flow through the windings, based on the detected current values. In other words, motor drive control requires a configuration for detecting the current values of the driving currents that flow through the windings, and a configuration for supplying driving currents to the windings.

FIG. 5 is a block diagram showing configurations of the PWM inverter 506 and the current detectors 507 and 508. As shown in FIG. 5, the PWM inverter 506 is provided with the same number of full bridge circuits as the number of phases of the motor 509 that is to be driven (two phases in the present embodiment) as driving circuits for the motor 509. Specifically, the PWM inverter 506 includes the full bridge circuits 530a and 530b that respectively correspond to the A-phase of the motor 509 and the B-phase of the motor 509. The PWM inverter 506 further includes the PWM signal generation unit 520a, a reverser 531a, and a shunt resistor 532a that correspond to the A-phase, and the PWM signal generation unit 520b, a reverser 531b, and a shunt resistor 532b that correspond to the B-phase.

The following describes a configuration in which a driving current is supplied to the A-phase winding of the motor 509. Note that a configuration for the B-phase is the same as that for the A-phase, and a description thereof is omitted.

As shown in FIG. 5, the full bridge circuit 530a includes FETs Q1 to Q4 that serve as switching elements, and is connected to a winding of the motor. The FETs Q1 to Q4 constitute an H bridge circuit, the winding is connected between the connection point of the FETs Q1 and Q3 and the connection point of the FETs Q2 and Q4. Furthermore, the drain terminals of the FETs Q1 and Q2 are connected to a power supply, and the source terminals of the FETs Q3 and Q4 are connected to one end of the shunt resistor 532a. Furthermore, the other end of the shunt resistor 532a is connected to a ground (GND).

The PWM signal generation unit 520a generates and outputs a PWM signal according to the duty ratio that corresponds to the driving voltage Vα that is input from the vector control unit 515, using a triangle wave comparison method. In the present embodiment, the duty ratio indicates the proportion of the H level period to the duration of one cycle of a PWM signal. However, this is not essential. For example, the duty ratio may indicate the proportion of an L level period to the duration of one cycle of a PWM signal.

Figure 6:
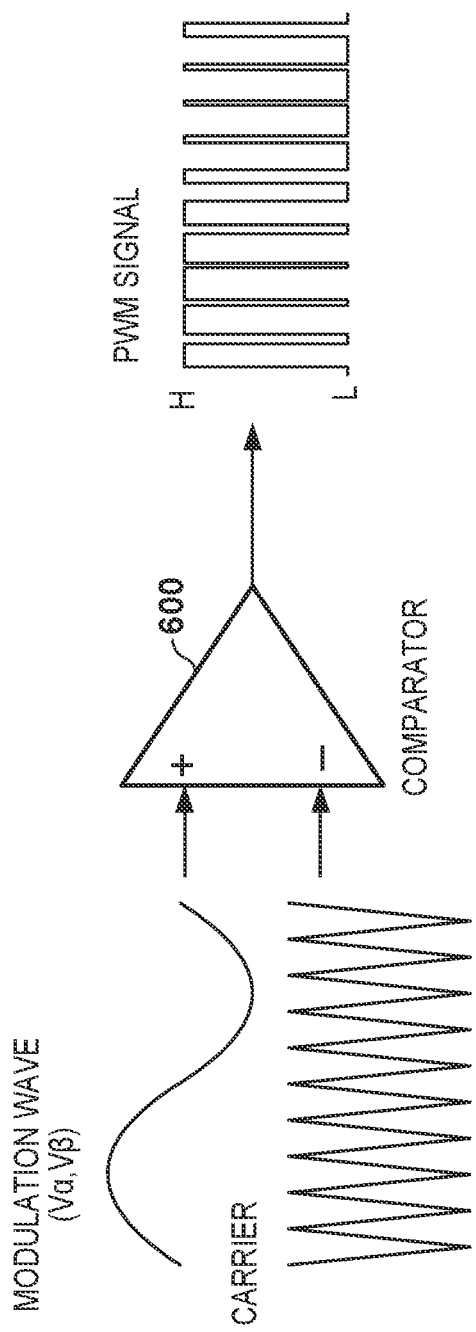
FIG. 6 is a diagram showing a concept of a triangle wave comparison method.

FIG. 6 is a diagram illustrating a configuration with which the PWM signal generation unit 520a generates a PWM signal. As shown in FIG. 6, the PWM signal generation unit 520a includes a comparator 600 that compares a modulation wave with a carrier wave. The PWM signal generation unit 520a generates a PWM signal by comparing the driving voltage Vα that serves as a modulation wave with a triangle wave that serves as a carrier wave using the comparator 600. Specifically, if the value (Vα) of the modulation wave is greater than or equal to the value of the triangle wave, the comparator 600 generates the PWM signal as a high level (H level) signal, and outputs the PWM signal to the FETs Q1 and Q4 and the reverser 531a. If the value (Vα) of the modulation wave is less than the value of the triangle wave, the comparator 600 generates the PWM signal as a low level (L level) signal, and outputs the PWM signal to the FETs Q1 and Q4 and the reverser 531a. Note that, in the present embodiment, it is assumed that the PWM signal generation unit 520a generates a triangle carrier wave at a predetermined frequency. It is also assumed that, if the duration of one cycle of the triangle carrier wave is defined as a period from a time point when the triangle carrier wave takes the minimum value to a time point when the triangle carrier wave next takes the minimum value, the waveform of one cycle of the triangle carrier wave (the waveform from the minimum value to the next minimum value) is symmetrical with respect to a time point when the value of the triangle carrier wave is the maximum value. The triangle carrier wave corresponding to the A-phase is synchronized with the triangle carrier wave corresponding to the B-phase. The PWM signal generation unit 520a outputs the duty ratio of the generated PWM signal and information regarding the frequency and the phase, which is information regarding the triangle carrier wave, to the current detector 507.

The reverser 531a reverses the phase of the PWM signal thus input, and outputs the PWM signal whose phase has been reversed (a reversed PWM signal), to the FETs Q2 and Q3. The FETs Q1 and Q4 are driven by the PWM signal thus input. The FETs Q2 and Q3 are driven by the reversed PWM signal thus input.

Specifically, the FETs Q1 to Q4 are in ON state when the input PWM signal is at the H level, and a current flows between the drain and the source. On the other hand, the FETs Q1 to Q4 are in OFF state when the input PWM signal is at the L level, and a current does not flow between the drain and the source. Note that the PWM signal that is input to the FETs Q1 and Q4 and the PWM signal that is input to the FETs Q2 and Q3 are in antiphase. Therefore, the FETs Q2 and Q3 are in OFF state when the FETs Q1 and Q4 are in ON state, and the FETs Q2 and Q3 are in ON state when the FETs Q1 and Q4 are in OFF state.

The ON and OFF operations of the FETs Q1 to Q4 are controlled in this way, and thus the magnitude and the direction of the driving currents supplied to a winding are controlled.

Next, a configuration for detecting the driving current flowing through the A-phase winding will be described.

Figure 7A:
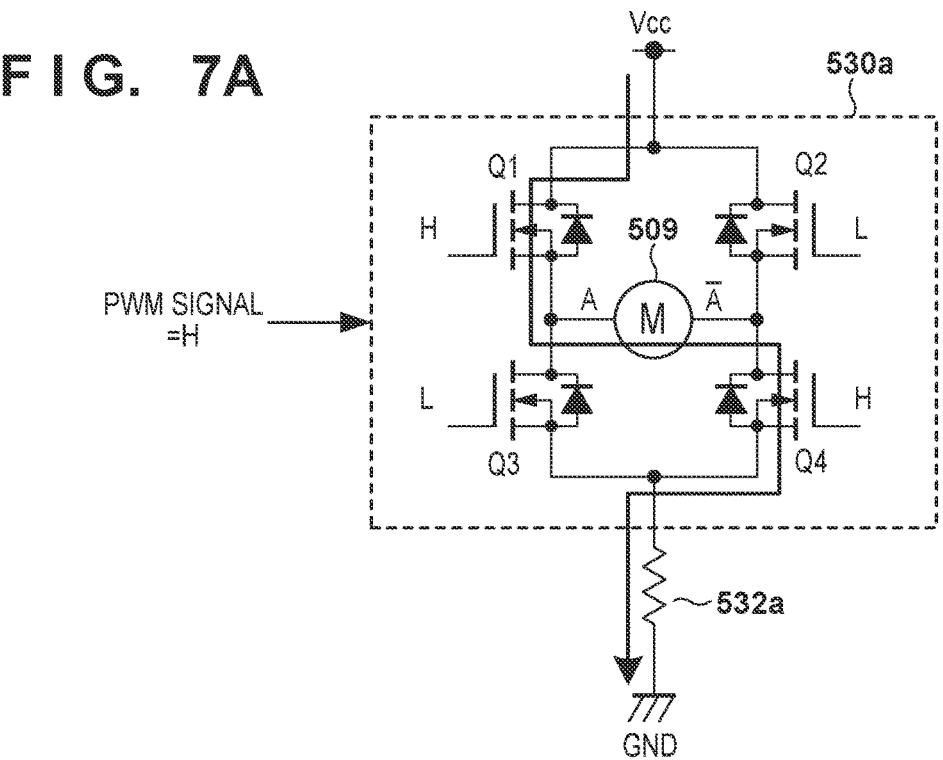
FIGS. 7A and 7B are diagrams showing examples of a relationship between an input PWM signal and a driving current in a full bridge circuit.
Figure 7B:
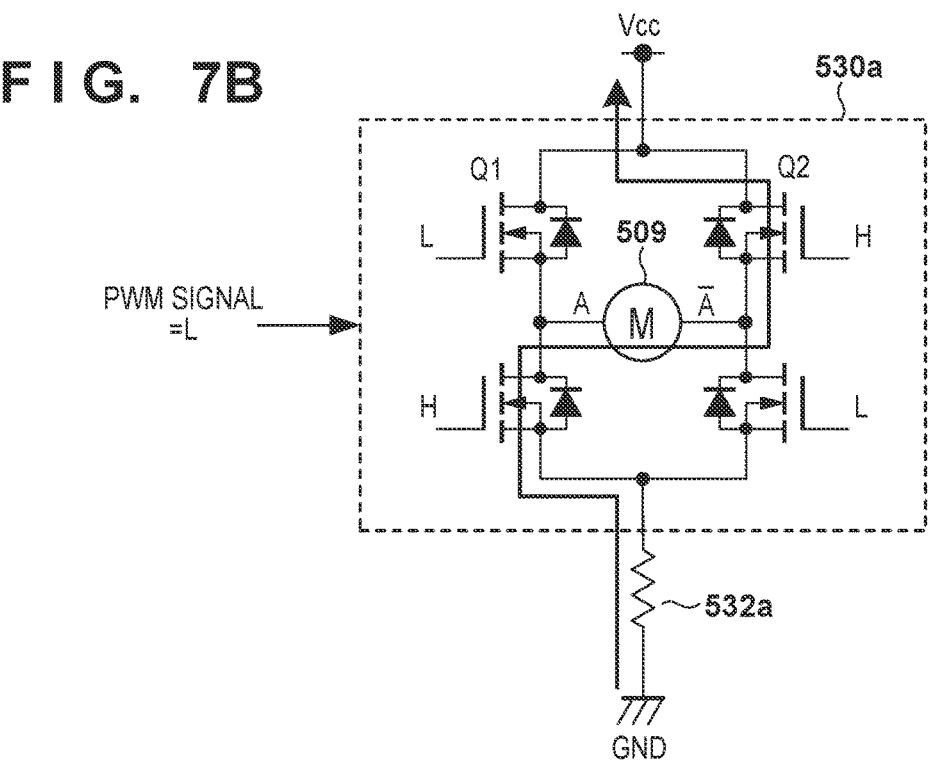

FIGS. 7A and 7B are diagrams showing an example of a relationship between the PWM signal that is input to the full bridge circuit 530a and the driving current flowing through a winding of the motor 509. FIG. 7A shows the driving current when the PWM signal is at the H level (the reversed PWM signal is at the L level). FIG. 7B shows the driving current when the PWM signal has switched from the H level to the L level. Note that both FIGS. 7A and 7B show an example in which the driving current flowing through the A-phase winding of the motor 509 flows in a direction from the connection point between the FETs Q1 and Q3 to the connection point between the FETs Q2 and Q4.

As shown in FIG. 7A, when the PWM signal is at the H level, the driving current flows from the power supply to the FET Q1, the winding of the motor, the FET Q4, and GND in this order. Then, when the PWM signal is switched from the H level to the L level, an induced electromotive force is generated in the winding of the motor, in the direction that prevents a change in the current. Consequently, the driving current flows from GND to the FET Q3, the winding of the motor, the FET Q2, and the power supply in this order.

The current detector 507 detects the driving current flowing through the A-phase winding, based on the voltage that is applied to the shunt resistor 532a. As described above, when the PWM signal is at the H level, the driving current flows from the power supply to the FET Q1, the winding of the motor, the FET Q4, and GND in this order. If the PWM signal is switched from the H level to the L level, the driving current flows from GND to the FET Q3, the winding of the motor, the FET Q2, and the power supply in this order. That is to say, even in the case where the driving current flowing through the A-phase winding of the motor 509 flows in the direction from the connection point between the FETs Q1 and Q3 to the connection point between the FETs Q2 and Q4, there are cases where the driving current flows in the direction from the power supply to GND and the case where the driving current flows in the direction from GND to the power supply. Therefore, when the driving current is detected based on the voltage across the two ends of the shunt resistor 532a, there is the possibility of the direction of the detected driving current differing from the direction of the driving current actually flowing through the winding. In such a case, if the motor is controlled based on the current value of the detected driving current, there is the possibility of control of the motor being unstable. Note that the same phenomenon occurs in the case where the driving current flowing through the A-phase winding of the motor 509 flows in the direction from the connection point between the FETs Q2 and Q4 to the connection point between the FETs Q1 and Q3.

Therefore, in the present embodiment, the current detector 507 reverses the polarity of the detected current value (voltage value) according to the level of the PWM signal at the time when the driving current is detected.

Specifically, for example, if the PWM signal at the time when the driving current is detected is at the H level, the current detector 507 does not reverse the polarity of the detected current value (voltage value). If the PWM signal at the time when the driving current is detected is at the L level, the current detector 507 reverses the polarity of the detected current value (voltage value).

<Timing of Detecting Driving Current>

If the period from when the level of the PWM signal is switched to when the level of the PWM signal is switched again (the duration of the H level or the L level) is short, there is the possibility of the FETs Q1 to Q4 being unable to respond to the switching of the level of the PWM signal. If this is the case, there is the possibility of the polarity of the current value (the voltage value) being switched despite not needing to be switched, and the direction of the detected driving current differing from the direction of the driving current actually flowing through the winding.

Therefore, in the present embodiment, the current detector 507 detects the driving current during the longer period out of a period in which the PWM signal is at the H level (hereinafter referred to as the "H period") and a period in which the PWM signal is at the L level (hereinafter referred to as the "L period"). By using such a configuration, it is possible to prevent the problem in which the direction of the detected driving current differs from the direction of the driving current that actually flows through the winding.

As described above, the duty ratio of the PWM signal and information regarding the triangle carrier wave, which have been output from the PWM signal generation unit 520a, are input to the current detector 507. The current detector 507 detects the current value in the H period if the input duty ratio is greater than or equal to 50%. Specifically, the current detector 507 detects the current value when the triangle carrier wave takes an extremum for the first time after the PWM signal generated by the PWM signal generation unit 520a has risen (has switched from the L level to the H level). The current detector 507 detects the current value in the L period if the input duty ratio is less than 50%. Specifically, the current detector 507 detects the current value when the triangle carrier wave takes an extremum for the first time after the PWM signal generated by the PWM signal generation unit 520a has fallen (has switched from the H level to the L level). In this way, the current value is detected when the triangle carrier wave takes an extremum, and therefore it is possible to prevent the current value from being detected at a time point when the PWM signal rises or falls. As a result, it is possible to prevent noise that is generated due to the switching elements switching when the PWM signal rises or falls, from being contained in the detected value.

Figure 8:
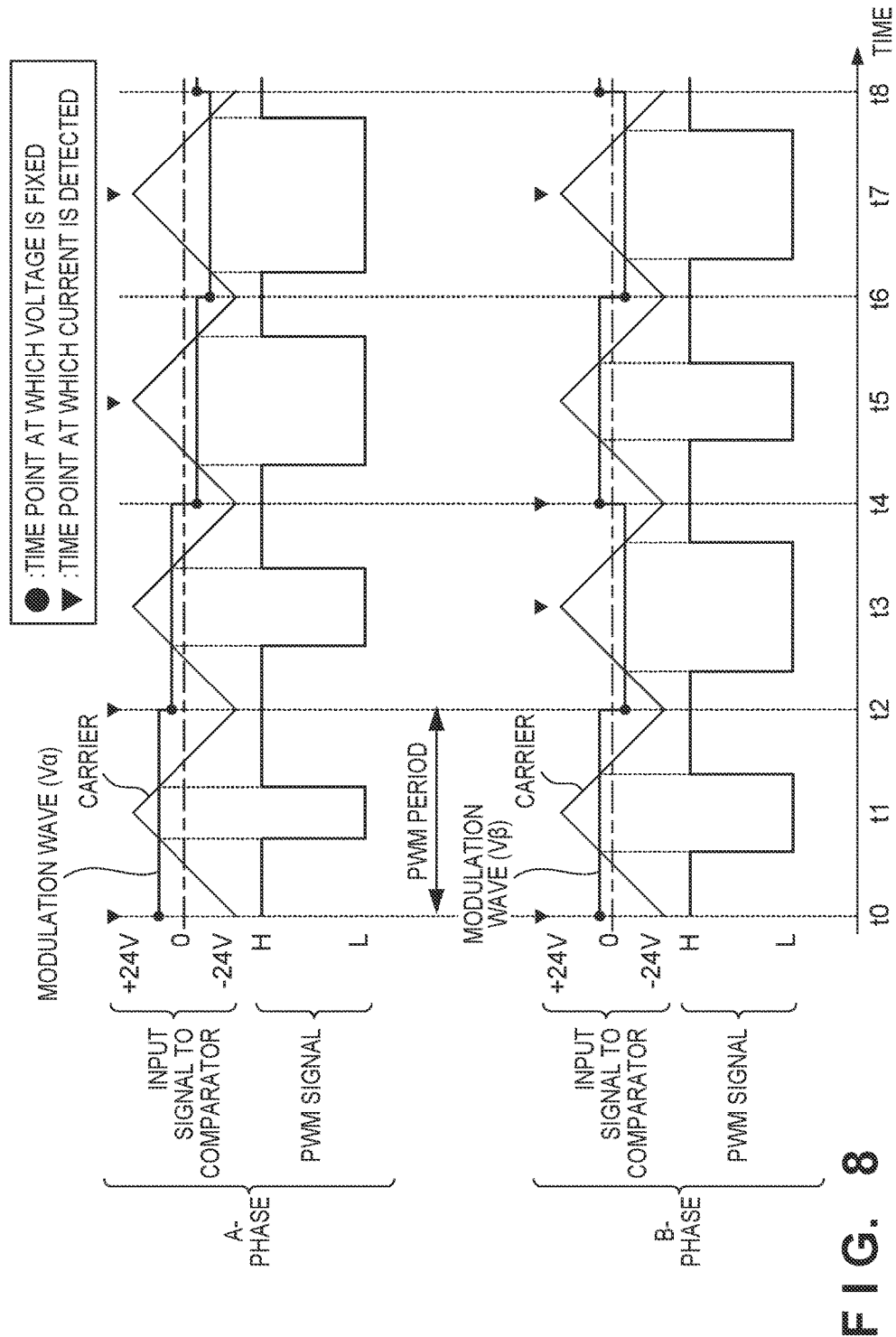
FIG. 8 is a diagram showing an example of the timing of detecting driving currents that correspond to an A-phase and a B-phase.

FIG. 8 is a diagram showing the timing of detecting the driving currents. In the example shown in FIG. 8, the case where the driving voltage is 24 V corresponds to the case where the duty ratio is 100%, the case where the driving voltage is 0 V corresponds to the case where the duty ratio is 50%, and the case where the driving voltage is −24 V corresponds to the case where the duty ratio is 0%.

As shown in FIG. 8, if the driving voltage is greater than or equal to 0 V, the current value is detected when the value of the triangle carrier wave is the minimum value. Also, if the driving voltage is negative, the current value is detected when the value of the triangle carrier wave is the maximum value. If the driving voltage changes from a positive value to a negative value, the timing of detecting the current value is changed from when the value of the triangle carrier wave is at the minimum to when the value of the triangle carrier wave is at the maximum. If the driving voltage changes from a negative value to a positive value, the timing of detecting the current value is changed from when the value of the triangle carrier wave is at the maximum to when the value of the triangle carrier wave is at the minimum.

In this way, if the timing of detecting the current value changes according to the value of the driving voltage, the current value cannot be detected in cycles that have a constant period.

The full bridge circuit 530a for the A-phase and the full bridge circuit 530b for the B-phase are driven independent of each other. Therefore, if the timing of detecting the current value changes according to the value of the driving voltage, there are cases where the detection time of the A-phase does not match the detection time of the B-phase, as shown in FIG. 8. In such cases, the motor is controlled based on the value of the A-phase current and the value of the B-phase current that are obtained at different timings.

Therefore, in the present embodiment, using the following configurations, the current detectors 507 and 508 are enabled to detect the driving current in each phase during the longer period out of the H period and the L period of the PWM cycles, at constant time intervals. Consequently, it is possible to prevent the motor from being controlled based on the A-phase value and the B-phase value that are obtained at different timings.

<PWM Signal Generation Units>

FIG. 9A is a block diagram showing the configuration of the PWM signal generation unit 520a in the present embodiment. Note that, although the PWM signal generation unit 520a will be described in the following description, the configuration of the PWM signal generation unit 520b is the same as the configuration of the PWM signal generation unit 520a.

As shown in FIG. 9A, the PWM signal generation unit 520a includes a reversing control unit 521, a carrier generation unit 522, a carrier reversing unit 523, and the comparator 600.

The carrier generation unit 522 generates a triangle carrier wave that has a predetermined frequency and a predetermined amplitude as a carrier, and outputs the generated carrier to the carrier reversing unit 523. In the present embodiment, the duration of one cycle of the PWM signal is defined as the period between one minimum point and the next minimum point of the carrier (the triangle wave). The triangle carrier wave corresponding to the A-phase is synchronized with the triangle carrier wave corresponding to the B-phase.

The driving voltage Vα (the modulation wave) that has been output from the vector control unit 515 is input to the comparator 600 and the reversing control unit 521. The reversing control unit 521 determines whether or not to perform reversing processing to reverse the polarity (positive or negative) of the carrier (the triangle wave) that has been generated by the carrier generation unit 522 (to reverse the phase), based on the driving voltage Vα, and controls the carrier reversing unit 523 based on the result of determination. Specifically, if the driving voltage Vα at the start time (e.g. t0 in FIG. 8) of the PWM period (e.g. the period from t0 to t2 in FIG. 8) is equal to or greater than 0 (Vα≥0), the reversing control unit 521 controls the carrier reversing unit 523 so that the carrier reversing unit 523 reverses the polarity of the triangle carrier wave in the PWM period. Consequently, the carrier reversing unit 523 reverses the polarity of the triangle carrier wave that has been output from the carrier generation unit 522, and outputs the triangle carrier wave that has the reversed polarity to the comparator 600. In contrast, if the driving voltage Vα at the start time of the PWM period is negative (Vα<0), the reversing control unit 521 controls the carrier reversing unit 523 so that the carrier reversing unit 523 does not reverse the polarity of the triangle carrier wave in the PWM period. Consequently, the carrier reversing unit 523 does not reverse the polarity of the triangle carrier wave that has been output from the carrier generation unit 522, and outputs the triangle carrier wave to the comparator 600.

FIG. 10 is a diagram showing the triangle carrier wave and the PWM signal in the case where the carrier reversing unit 523 is employed (the present embodiment). As shown in FIG. 10, a PWM signal 910 is generated as a result of the carrier reversing unit 523 being employed.

As described above, the current detector 507 detects the current value in the H period if the input duty ratio is greater than or equal to 50% (the driving voltage Vα is greater than or equal to 0). Specifically, the current detector 507 detects the current value when the triangle carrier wave takes an extremum for the first time after the PWM signal generated by the PWM signal generation unit 520a has risen (has switched from the L level to the H level). The current detector 507 detects the current value in the L period if the input duty ratio is less than 50% (the driving voltage Vα is less than 0). Specifically, the current detector 507 detects the current value when the triangle carrier wave takes an extremum for the first time after the PWM signal generated by the PWM signal generation unit 520a has fallen (has switched from the H level to the L level).

Therefore, as shown in FIG. 10, when the current value is detected based on the PWM signal 910, the current detector 507 detects the current value at the midpoint of the PWM period. That is to say, the current value is detected in cycles that have a constant period. Consequently, it is possible to prevent the motor from being controlled based on the A-phase value and the B-phase value that are obtained at different timings.

<Procedures for Detecting Driving Current>

Figure 11A:
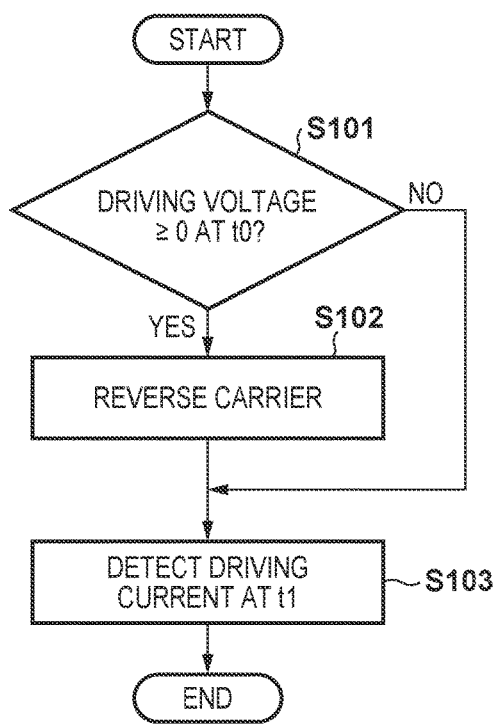
FIGS. 11A and 11B are flowcharts showing procedures that are performed by the motor control apparatus to detect a driving current.

FIG. 11A is a flowchart showing procedures that are performed by the motor control apparatus 157 in the first embodiment to detect the driving current. The motor control apparatus 157 executes the control procedures shown in FIG. 11A for each cycle of the PWM signals that are generated by the PWM signal generation units 520a and 520b. Although the detection of the driving current corresponding to the A-phase will be described in the following description, the same description applies to the driving current corresponding to the B-phase.

First, in step S101, the motor control apparatus 157 (the reversing control unit 521) determines whether or not the driving voltage Vα is greater than or equal to 0 (Vα≥0) at the start time (t0) of the PWM period.

If the driving voltage Vα is greater than or equal to 0, the motor control apparatus 157 (the carrier reversing unit 523), in step S102, reverses the polarity of the carrier in the PWM period as described above.

On the other hand, if the driving voltage Vα is negative (less than 0), the motor control apparatus 157 (the carrier reversing unit 523) does not execute the processing in step S102. That is to say, the motor control apparatus 157 (the carrier reversing unit 523) does not reverse the polarity of the carrier.

Thereafter, in step S103, the motor control apparatus 157 (the current detector 507) detects the driving current at the midpoint (t1) of the PWM period as described above, and ends the processing regarding the PWM period.

As described above, according to the present embodiment, the current detectors 507 and 508 can detect the driving currents corresponding to the respective phases in the longer period out of the H period and the L period in each PWM period at constant time intervals. Therefore, it is possible to prevent the motor from being controlled based on the value of the A-phase current and the value of the B-phase current that are obtained at different timings. Consequently, it is possible to equalize the timing at which the driving currents respectively corresponding to the A-phase and the B-phase (a plurality of phases) are detected in each PWM period. Therefore, it is possible to prevent a decrease in the accuracy of determination of the rotational phase θ of the rotor of the motor 509 due to a deviation in the timing at which the driving currents corresponding to the plurality of phases are detected.

In the present embodiment, the PWM period is defined as the period from one minimum point to the next minimum point of the carrier that is generated by the carrier generation unit 522. However, the PWM period may be defined as the period from one maximum point to the next maximum point of the carrier. In such a case, if the driving voltages Vα and Vβ at the start time of the PWM period are positive, the reversing control unit 521 does not cause the carrier reversing unit 523 to perform reversing processing, if the driving voltages Vα and Vβ are negative, the reversing control unit 521 causes the carrier reversing unit 523 to perform reversing processing. Consequently, in the same manner as in the above-described embodiment, a PWM signal can be generated so that the longer period out of the H period and the L period is invariably at the center of the PWM period.

In the present embodiment, the reversing control unit 521 instructs the carrier reversing unit 523 to reverse the phase of the triangle wave based on the polarity of the driving voltage, i.e. whether or not the duty ratio is greater than or equal to 50%. However, the present invention is not limited in this way. For example, the reversing control unit 521 may instruct the carrier reversing unit 523 to reverse the phase of the triangle wave based on whether or not the duty ratio is greater than or equal to 70%.

Second Embodiment

The configuration of the image forming apparatus is the same as that in the first embodiment. In the following description, differences between the configuration of the motor control apparatus 157 in the second embodiment and the configuration of the motor control apparatus 157 in the first embodiment will be described.

In the first embodiment, the carrier reversing unit 523 controls the polarity (positive or negative) of the carrier (the triangle carrier wave) and the PWM signal is generated based on the carrier that has the controlled polarity (positive or negative). In the second embodiment, the PWM signal is generated based on processing that is performed to reverse the polarity (positive or negative) of the driving voltage Vα or Vβ that is input to the PWM signal generation unit as a modulation wave, and processing that is performed to reverse the level of the PWM signal that is output from the comparator 600.

<PWM Signal Generation Units>

FIG. 9B is a block diagram showing the configuration of the PWM signal generation unit 520a in the present embodiment. Note that, although the PWM signal generation unit 520a will be described in the following description, the configuration of the PWM signal generation unit 520b is the same as the configuration of the PWM signal generation unit 520a.

As shown in FIG. 9B, the PWM signal generation unit 520a includes the reversing control unit 521, the carrier generation unit 522, a driving voltage reversing unit 524, a PWM signal reversing unit 525, and the comparator 600.

The carrier generation unit 522 generates a triangle carrier wave that has a predetermined frequency and a predetermined amplitude as a carrier, and outputs the generated carrier to the comparator 600. In the present embodiment, in the same manner as in the first embodiment, the duration of one cycle of the PWM signal is defined as the period between one minimum point to the next minimum point of the carrier (the triangle wave). It is assumed that the triangle carrier wave corresponding to the A-phase is synchronized with the triangle carrier wave corresponding to the B-phase.

The driving voltage Vα (the modulation wave) that has been output from the vector control unit 515 is input to the reversing control unit 521 and the driving voltage reversing unit 524.

The reversing control unit 521 determines whether or not to perform processing to reverse the driving voltage Vα using the driving voltage reversing unit 524 (the first reversing processing) and processing to reverse the PWM signal using the PWM signal reversing unit 525 (the second reversing processing), based on the driving voltage Vα. The reversing control unit 521 controls the driving voltage reversing unit 524 and the PWM signal reversing unit 525 according to the result of determination. Specifically, if the driving voltage Vα at the start time of the PWM period is greater than or equal to 0 (Vα≥0), the reversing control unit 521 controls the driving voltage reversing unit 524 and the PWM signal reversing unit 525 so that the driving voltage reversing unit 524 and the PWM signal reversing unit 525 performs reversing processing in the PWM period. Consequently, the driving voltage reversing unit 524 reverses the polarity of the driving voltage Vα, and outputs the driving voltage Vα that has the reversed polarity to the comparator 600. Also, the PWM signal reversing unit 525 reverses the level of the PWM signal, and outputs the PWM signal at the reversed level. If the driving voltage Vα at the start time of the PWM period is negative (Vα<0), the reversing control unit 521 controls the driving voltage reversing unit 524 and the PWM signal reversing unit 525 so that the driving voltage reversing unit 524 and the PWM signal reversing unit 525 does not perform reversing processing in the PWM period. Consequently, the driving voltage reversing unit 524 outputs the driving voltage Vα to the comparator 600 without reversing the polarity of the driving voltage Vα. Also, the PWM signal reversing unit 525 outputs the PWM signal without reversing the level of the PWM signal.

Figure 12:
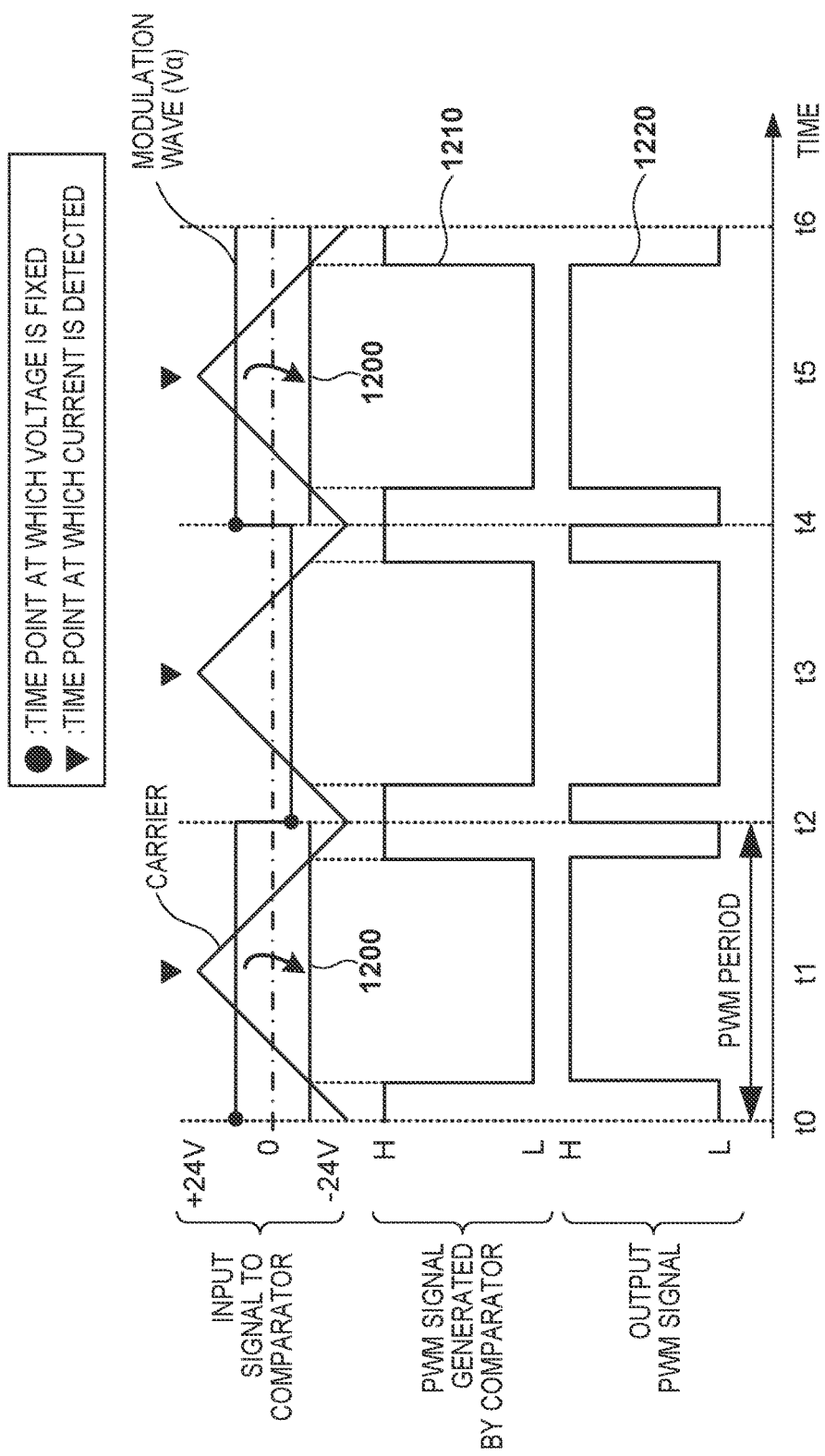
FIG. 12 is a diagram showing an example of a method for generating PWM signals and examples of time points at which a driving current is detected.

FIG. 12 is a diagram showing an example of a method for generating PWM signals and examples of time points at which the driving current is detected. A PWM signal 1210 that is shown in FIG. 12 is a PWM signal that has been generated by the comparator 600 based on the driving voltage Vα to which processing that is performed by the driving voltage reversing unit 524 has been applied. A PWM signal 1220 that is shown in FIG. 12 is a PWM signal to which processing that is performed by the PWM signal reversing unit 525 has been applied.

As described above, the current detector 507 detects the current value in the H period if the input duty ratio is greater than or equal to 50% (the driving voltage Vα is greater than or equal to 0). Specifically, the current detector 507 detects the current value when the triangle carrier wave takes an extremum for the first time after the PWM signal generated by the PWM signal generation unit 520a has risen (has switched from the L level to the H level). The current detector 507 detects the current value in the L period if the input duty ratio is less than 50% (the driving voltage Vα is less than 0). Specifically, the current detector 507 detects the current value when the triangle carrier wave takes an extremum for the first time after the PWM signal generated by the PWM signal generation unit 520a has fallen (has switched from the H level to the L level).

Therefore, the current detectors 507 and 508 detect the current value based on the PWM signal 1220, and thus the current detectors 507 and 508 can detect the current value at the midpoint of the PWM period. That is to say, the current value is detected in cycles that have a constant period. Consequently, it is possible to prevent the motor from being controlled based on the A-phase value and the B-phase value that are obtained at different timings.

<Procedures for Detecting Driving Current>

Figure 11B:
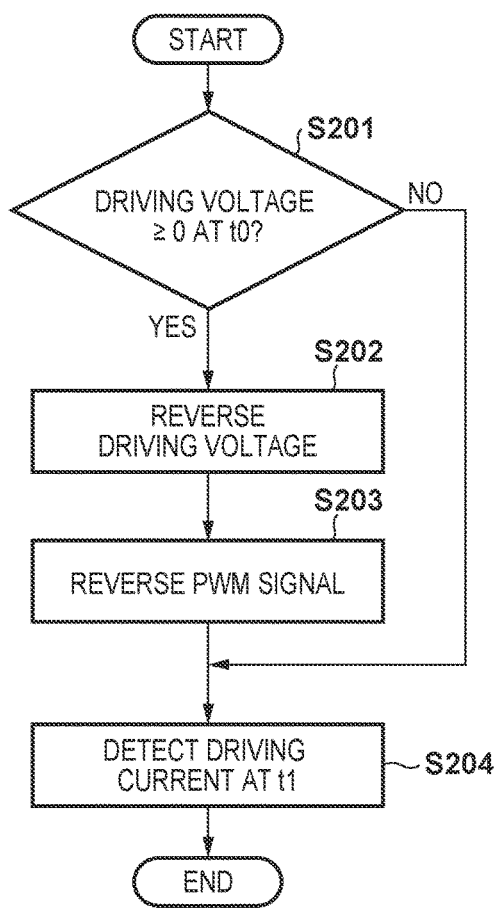

FIG. 11B is a flowchart showing procedures that are performed by the motor control apparatus 157 in the second embodiment to detect the driving current. In the same manner as in the first embodiment, the motor control apparatus 157 executes the control procedures shown in FIG. 11B for each cycle of the PWM signals that are generated by the PWM signal generation units 520a and 520b. Although the detection of the driving current corresponding to the A-phase will be described in the following description, the same description applies to the driving current corresponding to the B-phase.

First, in step S201, the motor control apparatus 157 (the reversing control unit 521) determines whether or not the driving voltage Vα is greater than or equal to 0 (Vα≥0) at the start time (t0) of the PWM period.

If the driving voltage Vα is greater than or equal to 0, the motor control apparatus 157 (the driving voltage reversing unit 524), in step S202, reverses the polarity of the driving voltage Vα in the PWM period as described above.

Furthermore, in step S203, the motor control apparatus 157 (the PWM signal reversing unit 525) reverses the level of the PWM signal output from the comparator 600, between the H level and the L level.

On the other hand, in step S202, if the driving voltage Vα is negative (less than 0), the motor control apparatus 157 does not perform processing in steps S202 and S203. That is to say, the motor control apparatus 157 does not reverse the polarity of the driving voltage Vα and the level of the PWM signal.

Thereafter, in step S204, the motor control apparatus 157 (the current detector 507) detects the driving current at the midpoint (t1) of the PWM period as described above, and ends the processing regarding the PWM period.

As described above, according to the present embodiment, the current detectors 507 and 508 can detect the driving currents corresponding to the respective phases in the longer period out of the H period and the L period in each PWM period at constant time intervals. Therefore, it is possible to prevent the motor from being controlled based on the value of the A-phase current and the value of the B-phase current that are obtained at different timings. Consequently, it is possible to equalize the timing at which the driving currents respectively corresponding to the A-phase and the B-phase (a plurality of phases) are detected in each PWM period. Therefore, it is possible to prevent a decrease in the accuracy of determination of the rotational phase θ of the rotor of the motor 509 due to a deviation in the timing at which the driving currents corresponding to the plurality of phases are detected.

Figure 13:
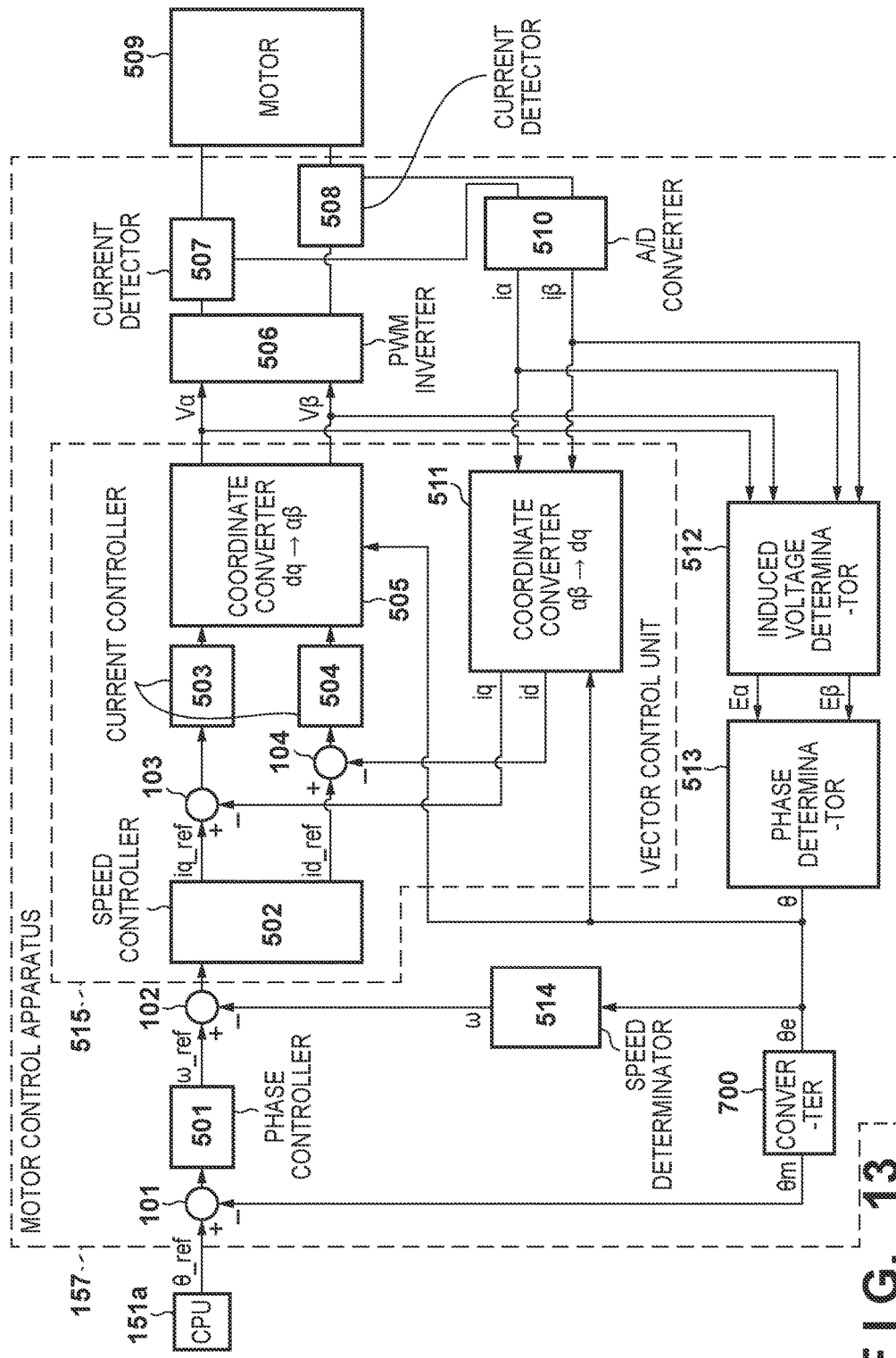
FIG. 13 is a diagram showing another example of a configuration of the motor control apparatus.

Note that, in the first embodiment and the second embodiment, if an actual rotational phase θm (mechanical angle) of the rotor of the motor 509 and a rotational phase θe (electrical angle) that is determined by the phase determinator 513 are not in one-to-one correspondence, a converter 700 that performs a conversion from an electrical angle to a mechanical angle may be provided between the phase determinator 513 and the phase controller 501 as shown in FIG. 13. If this is the case, the rotational phase θ of the rotor of the motor 509 is converted to an actual rotational phase (mechanical angle) by such a converter, and is then output to the phase controller 501.

Also, although a stepping motor is used in the first embodiment and the second embodiment as a motor for driving loads, another type of motor such as a DC motor may be used. Also, the motor is not limited to a two-phase motor, and another type of motor such as a three-phase motor may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-080474, filed Apr. 13, 2016, and 2017-056464, filed Mar. 22, 2017, which are hereby incorporated by reference herein in their entirety.

What is claimed is:

1. A motor control apparatus comprising:
a driving circuit that includes a plurality of switching elements constituting an H bridge circuit, and to which a winding of a motor is connected;
a detector configured to detect a driving current flowing through the winding;
a voltage generator configured to generate a driving voltage for the driving circuit based on the driving current detected by the detector; and
a pulse generator configured to generate a first PWM (Pulse-Width Modulation) signal and a second PWM signal that control ON and OFF operations of the plurality of switching elements, the first PWM signal being generated based on both the driving voltage generated by the voltage generator and a first triangle wave that serves as a carrier wave, and including a pulse at a first level that is one of a high level and a low level, and a pulse at a second level that is the other one of the high level and the low level, and the second PWM signal being generated based on both the driving voltage generated by the voltage generator and a second triangle wave that is in antiphase with the first triangle wave, and including a pulse at the first level and a pulse at the second level;
wherein a driving voltage in a first period is smaller than a predetermined value and a driving voltage in a second period is greater than or equal to the predetermined value, the first period being a period in which the first PWM signal generated by the pulse generator is at the second level and including a timing when the detector detects the driving current, the second period being a period in which the second PWM signal generated by the pulse generator is at the first level and including a timing when the detector detects the driving current.

2. The motor control apparatus according to claim 1, wherein the voltage generator is configured to generate the driving voltage such that a deviation between a driving current that is detected by the detector and a driving current that is to be supplied to the winding decreases.

3. The motor control apparatus according to claim 2, wherein the pulse generator includes:
a carrier generator configured to generate the first triangle wave;
a reverser configured to generate the second triangle wave by reversing a phase of the first triangle wave according to a polarity, which is positive or negative, of the driving voltage that is generated by the voltage generator; and
a comparator configured to, if the driving voltage is greater than or equal to 0, generate the second PWM signal by comparing the driving voltage with the second triangle wave, and if the driving voltage is negative, generate the first PWM signal by comparing the driving voltage with the first triangle wave.

4. The motor control apparatus according to claim 1, wherein the detector is configured to detect the driving current in each cycle of the first triangle wave.

5. The motor control apparatus according to claim 1, wherein the detector is configured to:
when the detector detects the driving current in the first period, detect the driving current at a time point when the first triangle wave first takes an extremum after the first PWM signal has switched from the first level to the second level; and when the detector detects the driving current in the second period, detect the driving current at a time point when the first triangle wave first takes an extremum after the second PWM signal has switched from the second level to the first level.

6. The motor control apparatus according to claim 1, wherein the plurality of switching elements are ON if the first PWM signal is at the first level,
the plurality of switching elements are OFF if the first PWM signal is at the second level,
the plurality of switching elements are ON if the second PWM signal is at the first level,
the plurality of switching elements are OFF if the second PWM signal is at the second level, and
the detector is configured to not reverse the polarity of the driving current when the detector detects the driving current in a period in which the first PWM signal is at the first level or a period in which the second PWM signal is at the first level, and reverse the polarity of the driving current when the detector detects the driving current in a period in which the first PWM signal is at the second level or a period in which the second PWM signal is at the second level.

7. The motor control apparatus according to claim 1, wherein the pulse generator, the driving circuit, and the detector are provided for each of a first phase of the motor and a second phase of the motor,
a triangle wave that corresponds to the first phase is synchronized with a triangle wave that corresponds to the second phase,
the detector that corresponds to the first phase is configured to detect a driving current flowing through a winding that corresponds to the first phase,
the detector that corresponds to the second phase is configured to detect a driving current flowing through a winding that corresponds to the second phase,
the motor control apparatus further comprises a phase determiner configured to determine a rotational phase of a rotor of the motor based on: the driving current flowing through the winding that corresponds to the first phase, and that is detected by the detector that corresponds to the first phase; and the driving current flowing through the winding that corresponds to the second phase, and that is detected by the detector that corresponds to the second phase, and
the motor control apparatus is configured to control the motor by controlling the driving current flowing through the winding that corresponds to the first phase and the driving current flowing through the winding that corresponds to the second phase, such that a deviation between an instruction phase that indicates a target phase of the rotor of the motor and the rotational phase that is determined by the phase determiner decreases.

8. The motor control apparatus according to claim 7, further comprising:
a voltage determiner configured to determine a value of an induced voltage that is induced in the winding that corresponds to the first phase and a value of an induced voltage that is induced in the winding that corresponds to the second phase, based on the driving currents that are detected by the detectors, the induced voltages being induced by a rotation of the rotor of the motor,
wherein the phase determiner is configured to determine the rotational phase based on the value of the induced voltage corresponding to the first phase and the value of the induced voltage corresponding to the second phase that are determined by the voltage determiner.

9. The motor control apparatus according to claim 8, wherein the motor control apparatus is configured to control the motor based on a torque current component that is a current component of a current value represented in a rotating coordinate system with the rotational phase as a reference, such that the deviation between the instruction phase and the rotational phase that is determined by the phase determiner decreases, the torque current component being a current component that generates torque in the rotor.

10. The motor control apparatus according to claim 1, wherein the predetermined value is a value of 0.

11. The motor control apparatus according to claim 1, wherein the driving circuit is a circuit in which,
one end of a first switching element and one end of a second switching element are connected to a power supply,
one end of a third switching element is connected in series to the other end of the first switching element,
one end of a fourth switching element is connected in series to the other end of the second switching element,
a resistor is connected to the other end of the third switching element and the other end of the fourth switching element,
the resistor is grounded, and
one end of a winding of the motor is connected to a conducting line that connects the first switching element and the third switching element to each other, and the other end of the winding of the motor is connected to a conducting line that connects the second switching element and the fourth switching element to each other.

12. The motor control apparatus according to claim 11, wherein PWM signals that are generated by the pulse generators are supplied to the first switching elements and the fourth switching elements of the driving circuits, and
PWM signals that are respectively in antiphase with the PWM signals that are generated by the pulse generators are supplied to the second switching elements and the third switching elements of the driving circuits.

13. A sheet conveyance apparatus comprising:
a conveyance roller configured to convey a sheet;
a motor configured to drive the conveyance roller;
a driving circuit that includes a plurality of switching elements constituting an H bridge circuit, and to which a winding of a motor is connected;
a detector configured to detect a driving current flowing through the winding;
a voltage generator configured to generate a driving voltage for driving the driving circuit based on the driving current detected by the detector; and
a pulse generator configured to generate a first PWM (Pulse-Width Modulation) signal and a second PWM signal that control ON and OFF operations of the plurality of switching elements, the first PWM signal being generated based on both the driving voltage generated by the voltage generator and a first triangle wave that serves as a carrier wave, and including a pulse at a first level that is one of a high level and a low level, and a pulse at a second level that is the other one of the high level and the low level, and the second PWM signal being generated based on both the driving voltage generated by the voltage generator and a second triangle wave that is in antiphase with the first triangle wave, and including a pulse at the first level and a pulse at the second level, wherein a driving voltage in a first period is smaller than a predetermined value, and a driving voltage in a second period is greater than or equal to the predetermined value, the first period being a period in which the first PWM signal generated by the pulse generator is at the second level and including a timing when the detector detects the driving current, the second period being a period in which the second PWM signal generated by the pulse generator is at the first level and including a timing when the detector detects the driving current.

14. A document feeding apparatus comprising:
a document tray on which a document is to be stacked;
a conveyance roller configured to convey the document that is stacked on the document tray;
a motor configured to drive the conveyance roller;
a driving circuit that includes a plurality of switching elements constituting an H bridge circuit, and to which a winding of a motor is connected;
a detector configured to detect a driving current flowing through the winding;
a voltage generator configured to generate a driving voltage for driving the driving circuit based on the driving current detected by the detector; and
a pulse generator configured to generate a first PWM (Pulse-Width Modulation) signal and a second PWM signal that control ON and OFF operations of the plurality of switching elements, the first PWM signal being generated based on both the driving voltage generated by the voltage generator and a first triangle wave that serves as a carrier wave, and including a pulse at a first level that is one of a high level and a low level, and a pulse at a second level that is the other one of the high level and the low level, and the second PWM signal being generated based on both the driving voltage generated by the voltage generator and a second triangle wave that is in antiphase with the first triangle wave, and including a pulse at the first level and a pulse at the second level, wherein a driving voltage in a first period is smaller than a predetermined value, and a driving voltage in a second period is greater than or equal to the predetermined value, the first period being a period in which the first PWM signal generated by the pulse generator is at the second level and including a timing when the detector detects the driving current, the second period being a period in which the second PWM signal generated by the pulse generator is at the first level and including a timing when the detector detects the driving current.

15. A document reading apparatus comprising:
a document tray on which a document is to be stacked;
a conveyance roller configured to convey the document that is stacked on the document tray;
a reading unit configured to read the document that is conveyed by the conveyance roller;
a motor configured to drive the conveyance roller;
a driving circuit that includes a plurality of switching elements constituting an H bridge circuit, and to which a winding of a motor is connected;
a detector configured to detect a driving current flowing through the winding;
a voltage generator configured to generate a driving voltage for driving the driving circuit based on the driving current detected by the detector; and
a pulse generator configured to generate a first PWM (Pulse-Width Modulation) signal and a second PWM signal that control ON and OFF operations of the plurality of switching elements, the first PWM signal being generated based on both the driving voltage generated by the voltage generator and a first triangle wave that serves as a carrier wave, and including a pulse at a first level that is one of a high level and a low level, and a pulse at a second level that is the other one of the high level and the low level, and the second PWM signal being generated based on both the driving voltage generated by the voltage generator and a second triangle wave that is in antiphase with the first triangle wave, and including a pulse at the first level and a pulse at the second level, wherein a driving voltage in a first period is smaller than a predetermined value a driving voltage in a second period is greater than or equal to the predetermined value, the first period being a period in which the first PWM signal generated by the pulse generator is at the second level and including a timing when the detector detects the driving current, the second period being a period in which the second PWM signal generated by the pulse generator is at the first level and including a timing when the detector detects the driving current.

16. An image forming apparatus, comprising:
an image forming unit configured to form an image on a recording medium;
a motor configured to drive a load;
a driving circuit that includes a plurality of switching elements constituting an H bridge circuit, and to which a winding of a motor is connected;
a detector configured to detect a driving current flowing through the winding;
a voltage generator configured to generate a driving voltage for driving the driving circuit based on the driving current detected by the detector; and
a pulse generator configured to generate a first PWM (Pulse-Width Modulation) signal and a second PWM signal that control ON and OFF operations of the plurality of switching elements, the first PWM signal being generated based on both the driving voltage generated by the voltage generator and a first triangle wave that serves as a carrier wave, and including a pulse at a first level that is one of a high level and a low level, and a pulse at a second level that is the other one of the high level and the low level, and the second PWM signal being generated based on both the driving voltage generated by the voltage generator and a second triangle wave that is in antiphase with the first triangle wave, and including a pulse at the first level and a pulse at the second level, wherein a driving voltage in a first period is smaller than a predetermined value and a driving voltage in a second period is greater than or equal to the predetermined value, the first period being a period in which the first PWM signal generated by the pulse generator is at the second level and including a timing when the detector detects the driving current, the second period being a period in which the second PWM signal generated by the pulse generator is at the first level and including a timing when the detector detects the driving current.

17. The image forming apparatus according to claim 16, wherein the load is a conveyance roller that is configured to convey the recording medium.

* * * * *